(12) United States Patent
Kim

(10) Patent No.: US 9,545,966 B2
(45) Date of Patent: Jan. 17, 2017

(54) INSPECTION DEVICE OF VEHICLE DRIVER ASSISTANCE SYSTEMS

(71) Applicant: Hyundai Motor Company, Seoul (KR)

(72) Inventor: Sinkuk Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 141 days.

(21) Appl. No.: 14/491,088

(22) Filed: Sep. 19, 2014

(65) Prior Publication Data

US 2015/0134191 A1  May 14, 2015

(30) Foreign Application Priority Data

Nov. 14, 2013  (KR) .......................... 10-2013-0138443

(51) Int. Cl.
*B60W 30/12* (2006.01)
*B62D 65/00* (2006.01)
*G01M 17/007* (2006.01)

(52) U.S. Cl.
CPC .......... *B62D 65/005* (2013.01); *G01M 17/007* (2013.01); *B60Y 2300/12* (2013.01)

(58) Field of Classification Search
None
See application file for complete search history.

(56) References Cited

U.S. PATENT DOCUMENTS 5,612,905 A * 3/1997 Maillart ............. G01B 11/2518
                                                        250/559.22
5,676,217 A * 10/1997 Torii .................... B60K 31/047
                                                        180/171
5,809,658 A * 9/1998 Jackson ............. G01B 11/2755
                                                        33/203.18
5,850,254 A * 12/1998 Takano ..................... B60R 1/00
                                                        180/167
6,191,705 B1 * 2/2001 Oomen ................ G07B 15/063
                                                        235/384
6,714,156 B1 * 3/2004 Ibrahim ................ G01S 7/4026
                                                        342/165

(Continued)

FOREIGN PATENT DOCUMENTS

KR    102006005419 2     * 12/2007

OTHER PUBLICATIONS

Machine Translation of KR 1020060054192.*

*Primary Examiner* — John R Olszewski
*Assistant Examiner* — Navid Ziaeianmehdizadeh
(74) *Attorney, Agent, or Firm* — Mintz Levin Cohn Ferris Glovsky and Popeo, P.C.; Peter F. Corless

(57) ABSTRACT

An inspection device for vehicle driver assistance systems (DASs) mounted on a vehicle may include: i) a frame unit including pillar frames, where vehicles forwardly enter and backwardly exit, at respective corners of a base frame, and an upper frame is coupled to upper end portions of the pillar frames; a correction unit installed at the upper frame such that it is movable in multi-axis directions so as to correct a camera measurement point of a lane departure warning system (LDWS) at a front side of the vehicle and configured to display a correction target with respect to the camera as an image; and an inspection unit installed at the upper frame such that it is movable in multi-axis directions so as to check a normal operation of the LDWS and configured to display a driving lane as an image.

17 Claims, 15 Drawing Sheets

(56) References Cited

U.S. PATENT DOCUMENTS

| | | | | |
|---|---|---|---|---|
| 7,121,011 B2* | 10/2006 | Murray | G01B 11/272 | 33/203.18 |
| 7,424,387 B1* | 9/2008 | Gill | G01B 11/272 | 33/288 |
| 9,056,630 B2* | 6/2015 | Han | B62D 15/029 | |
| 9,080,866 B1* | 7/2015 | Dowdall | G01S 17/023 | |
| 9,187,028 B2* | 11/2015 | Higgins-Luthman | B60Q 1/143 | |
| 9,193,303 B2* | 11/2015 | Higgins-Luthman | B60R 1/00 | |
| 2001/0048446 A1* | 12/2001 | Ishida | B60R 1/00 | 345/619 |
| 2002/0027651 A1* | 3/2002 | Jackson | G01B 11/2755 | 356/139.09 |
| 2002/0072869 A1* | 6/2002 | Stiller | G01C 21/26 | 702/90 |
| 2003/0065466 A1* | 4/2003 | Jackson | G01B 11/2755 | 702/94 |
| 2003/0225536 A1* | 12/2003 | Jackson | G01B 11/2755 | 702/94 |
| 2004/0016870 A1* | 1/2004 | Pawlicki | G06K 9/4604 | 250/208.1 |
| 2004/0178892 A1* | 9/2004 | Anderson | B60Q 1/2665 | 340/435 |
| 2006/0152711 A1* | 7/2006 | Dale, Jr. | G01B 11/2755 | 356/139.09 |
| 2007/0164852 A1* | 7/2007 | Litkouhi | B60G 17/0195 | 340/435 |
| 2008/0055114 A1* | 3/2008 | Kim | B60R 1/00 | 340/937 |
| 2008/0231710 A1* | 9/2008 | Asari | H04N 17/002 | 348/187 |
| 2009/0179916 A1* | 7/2009 | Williams | G06T 7/0018 | 345/629 |
| 2010/0172542 A1* | 7/2010 | Stein | G06K 9/00798 | 382/103 |
| 2010/0179781 A1* | 7/2010 | Raphael | G06K 9/00791 | 702/94 |
| 2010/0194890 A1* | 8/2010 | Weller | B60R 1/12 | 348/148 |
| 2010/0238283 A1* | 9/2010 | Kim | G06T 7/0042 | 348/135 |
| 2010/0238291 A1* | 9/2010 | Pavlov | B60R 11/04 | 348/148 |
| 2010/0265325 A1* | 10/2010 | Lo | B62D 15/029 | 348/119 |
| 2011/0077900 A1* | 3/2011 | Corghi | G01B 11/2755 | 702/150 |
| 2011/0216194 A1* | 9/2011 | Kosaki | H04N 7/18 | 348/148 |
| 2012/0154588 A1* | 6/2012 | Kim | G06K 9/4633 | 348/148 |
| 2012/0320209 A1* | 12/2012 | Vico | B60R 1/00 | 348/148 |
| 2013/0027195 A1* | 1/2013 | Van Wiemeersch | B60W 30/12 | 340/431 |
| 2013/0070086 A1* | 3/2013 | Seifert | G01B 11/275 | 348/135 |
| 2013/0088382 A1* | 4/2013 | Lee | G01S 7/4026 | 342/174 |
| 2013/0135474 A1* | 5/2013 | Sakano | G06T 7/0018 | 348/148 |
| 2013/0239425 A1* | 9/2013 | Ham | G01B 5/24 | 33/533 |
| 2013/0321630 A1* | 12/2013 | Shin | G08G 1/167 | 348/148 |
| 2013/0325252 A1* | 12/2013 | Schommer | G01S 7/40 | 701/33.1 |
| 2014/0002656 A1* | 1/2014 | Woo | G08G 1/167 | 348/148 |
| 2014/0043473 A1* | 2/2014 | Gupta | G06T 7/0018 | 348/135 |
| 2014/0083161 A1* | 3/2014 | Pucnik | G01B 11/275 | 73/1.79 |
| 2014/0320658 A1* | 10/2014 | Pliefke | B60R 1/002 | 348/148 |
| 2014/0327765 A1* | 11/2014 | Hsien | G06T 7/0018 | 348/143 |
| 2014/0359994 A1* | 12/2014 | Park | B62D 65/005 | 29/407.05 |
| 2015/0341628 A1* | 11/2015 | Zeng | H04N 17/002 | 348/148 |

\* cited by examiner (a)

(b)

INSPECTION DEVICE OF VEHICLE DRIVER ASSISTANCE SYSTEMS

CROSS-REFERENCE TO RELATED APPLICATION

This application claims under 35 U.S.C. §119(a) priority to and the benefit of Korean Patent Application No. 10-2013-0138443 filed in the Korean Intellectual Property Office on Nov. 14, 2013, the entire contents of which are incorporated herein by reference.

BACKGROUND (a) Field of the Invention

The present invention relates to an inspection device of vehicle driver assistance systems, and more particularly, to an inspection device of vehicle driver assistance systems for intensively inspecting various kinds of vehicle driver assistance systems.

(b) Description of the Related Art

Recently, various kinds of vehicle driver assistance systems (DASs) have been equipped in vehicles to provide convenience and safety of driving to a driver while a vehicle is being driven.

The DASs helps drivers to keep a current driving lane, give alarms for lane departure, secure a safety distance from adjacent vehicles, prevent a collision with adjacent obstacles, and control speed depending on traffic situations or road conditions, etc. by utilizing various kinds of cameras, radar sensors, etc. without driver intervention.

These DASs have been generally applied to luxury vehicles, but recently, have been extensively applied even to compact and mid-size vehicles because interest in environmentally-friendly economical driving has increased to protect the environment and conserve energy resources.

For example, the DASs may include systems such as a smart cruise control (SCC) system, a lane departure warning system (LDWS), a blind spot detection (BSD) system, an around view monitoring (AVM) system, etc.

Meanwhile, in a vehicle inspection line during assembly processes of the vehicle, various kinds of DASs mounted on the vehicle are checked to ensure normal operation.

For example, the vehicle is moved to inspection spots for performing a wheel alignment inspection process, a roll & brake inspection process, an automatic diagnosis process, etc., so as to check normal operation of the various kinds of DASs during these processes.

However, in the related art, since inspection processes for the various kinds of DASs are separated from each other according to their functions in the vehicle inspection line, an inspection cycle time increases, and thus it is difficult to utilize inspection manpower and to control quality.

In addition, in the inspection processes of the various kinds of DASs in the vehicle inspection line, an inspection facility is exclusively manufactured for one type of vehicle, so the inspection facility should be modified or newly manufactured to be applicable to new types of vehicles, thereby requiring additional manpower and increased investment cost.

The above information disclosed in this Background section is only for enhancement of understanding of the background of the invention and therefore it may contain information that does not form the prior art that is already known in this country to a person of ordinary skill in the art.

SUMMARY

The present invention discloses an inspection device for vehicle driver assistance systems (DASs) that is capable of integrating separated inspection processes into a single process and sharing inspections of various DASs applied to various types of vehicles.

An exemplary embodiment of the present invention may provide an inspection device for vehicle driver assistance systems (DASs) for inspecting DASs mounted on a vehicle, that may include: a frame unit including pillar frames, where vehicles forwardly enter and backwardly exit, at respective corners of a base frame, wherein an upper frame is coupled to upper end portions of the pillar frames; an LDWS correction unit installed at the upper frame such that it is movable in multi-axis directions so as to correct a camera measurement point of an LDWS at a front side of the vehicle and configured to display a correction target with respect to the camera as an image; and an LDWS inspection unit installed at the upper frame such that it is movable in multi-axis directions so as to check a normal operation of the LDWS and configured to display a driving lane as an image.

The inspection device of the vehicle DASs may further include a position aligning unit installed at the base frame and configured to align different kinds of vehicles at a predetermined position.

The inspection device of the vehicle DASs may further include inspection units respectively installed at the frame unit and configured to check normal operations of DASs including an SCC, BSDs, and AVMs.

The inspection device of the vehicle DASs may further include an SCC inspection unit respectively installed at the base frame so as to check a normal operation of an SCC at the front side of the vehicle.

The inspection device of the vehicle DASs may further include a BSD inspection unit installed at the upper frame at a vehicle entry side so as to check a normal operation of BSDs at rear sides of the vehicle.

The inspection device of the vehicle DASs may further include an AVM inspection unit installed at a top surface of the base frame so as to check normal operations of respective AVMs at front/rear and both lateral sides of the vehicle.

In the inspection device of the vehicle DASs according to the exemplary embodiment of the present invention, the LDWS correction unit may further include at least one first LCD monitor that displays a correction target and is capable of adjusting an image position and an image size of the correction target.

In the inspection device of the vehicle DASs according to the exemplary embodiment of the present invention, the first LCD monitor may be installed such that it is movable in front/rear, left/right, and up/down directions by a first moving unit including a servo motor and an actuating cylinder.

In the inspection device of the vehicle DASs according to the exemplary embodiment of the present invention, the LDWS inspection unit may include a second LCD monitor that displays a driving lane and is capable of adjusting an image position and an image size of the driving lane. In the inspection device of the vehicle DASs according to the exemplary embodiment of the present invention, the second LCD monitor may be installed at the upper frame such that it is movable in front/rear, left/right, and up/down directions by a second moving unit including a servo motor and an actuating cylinder.

In the inspection device of the vehicle DASs according to the exemplary embodiment of the present invention, the SCC inspection unit may be installed at the base frame such that it is movable in multi-axis directions, and includes a first target member including at least one first radar reflector with respect to the SCC.

In the inspection device of the vehicle DASs according to the exemplary embodiment of the present invention, the first target member may be installed at the base frame such that it is movable in front/rear, left/right, and up/down directions by a third moving unit including a servo motor.

In the inspection device of the vehicle DASs according to the exemplary embodiment of the present invention, the first radar reflectors may be provided in plural at the first target member.

In the inspection device of the vehicle DASs according to the exemplary embodiment of the present invention, the SCC inspection unit may further include a blocking member that is configured to unblock any one of the first radar reflectors and block the remaining ones or to block the any one.

In the inspection device of the vehicle DASs according to the exemplary embodiment of the present invention, the blocking member may be installed at the first target member such that it is reciprocally movable in left/right directions by an actuating cylinder.

In the inspection device of the vehicle DASs according to the exemplary embodiment of the present invention, the BSD inspection units may be installed as a pair at the upper frame, which connects the pair of pillar frames at the vehicle entry side, such that they are movable in multi-axis directions and respectively include a second target member including a second radar reflector with respect to the BSD.

In the inspection device of the vehicle DASs according to the exemplary embodiment of the present invention, the second target member may be installed at the upper frame such that it is movable in front/rear, left/right, and up/down directions by a fourth moving unit.

In the inspection device of the vehicle DASs according to the exemplary embodiment of the present invention, the second target member may be provided such that it is upwardly and downwardly swingable by the actuating cylinder when vehicles enter or exit.

In the inspection device of the vehicle DASs according to the exemplary embodiment of the present invention, the AVM inspection unit may include a plurality of third target members, which are installed on a top surface of the base frame such that they are movable in the front/rear directions.

In the inspection device of the vehicle DASs according to the exemplary embodiment of the present invention, the third target members may be installed at the base frame such that they are movable in front/rear directions by an actuating cylinder and a link member.

Another exemplary embodiment of the present invention may provide an inspection device of vehicle driver assistance systems (DASs) for inspecting the DASs mounted on a vehicle, that may include: a frame unit including pillar frames, where the vehicle is moved forward to enter and is moved backward to exit, at respective corners of a base frame, wherein an upper frame is coupled to upper end portions of the pillar frames; a position aligning unit installed at the base frame and configured to align different kinds of vehicles at a predetermined position; an LDWS correction unit installed at the upper frame such that it is movable in accordance with a front side of a vehicle in front/rear, left/right, and up/down directions so as to correct a camera measurement point of an LDWS at the front side of the vehicle and configured to display a correction target with respect to the camera as an image; an LDWS inspection unit installed at the upper frame such that it is movable in accordance with the front side of the vehicle in the front/rear and up/down directions and configured to display a driving lane as an image so as to check a normal operation of the LDWS; an SCC inspection unit installed at the base frame such that it is movable in accordance with the front side of the vehicle in front/rear, left/right and up/down directions so as to check a normal operation of an SCC at the front side of the vehicle; a BSD inspection unit at the upper frame, which connects a pair of pillar frames at a vehicle entry side, such that it is movable in the front/rear, the left/right, and the up/down directions so as to check normal operations of BSDs at the rear side of the vehicle; and an AVM inspection unit installed at a top surface of the base frame such that it is movable in the front/rear directions so as to check normal operations of the AVMs at the front/rear and the left/right sides of the vehicle.

The exemplary embodiments of the present invention may integrate the separated correction/inspection processes of the various kinds of DASs into a single process, and may share the correction/inspections of the various kinds of DASs that are applied to the different kinds of vehicles.

Accordingly, in the exemplary embodiment of the present invention, an inspection cycle time may be reduced to save inspection manpower and to efficiently perform quality management, such that flexible production for various types of vehicles is possible, in addition to saving additional manpower and investment cost due to modification and/or new construction of the inspection facility when a new kind of vehicle is applied.

BRIEF DESCRIPTION OF THE DRAWINGS

The drawings are intended to be used as references for describing the exemplary embodiments of the present invention, and the accompanying drawings should not be construed as limiting the technical spirit of the present invention.

DETAILED DESCRIPTION OF THE EMBODIMENTS

Figure 1:
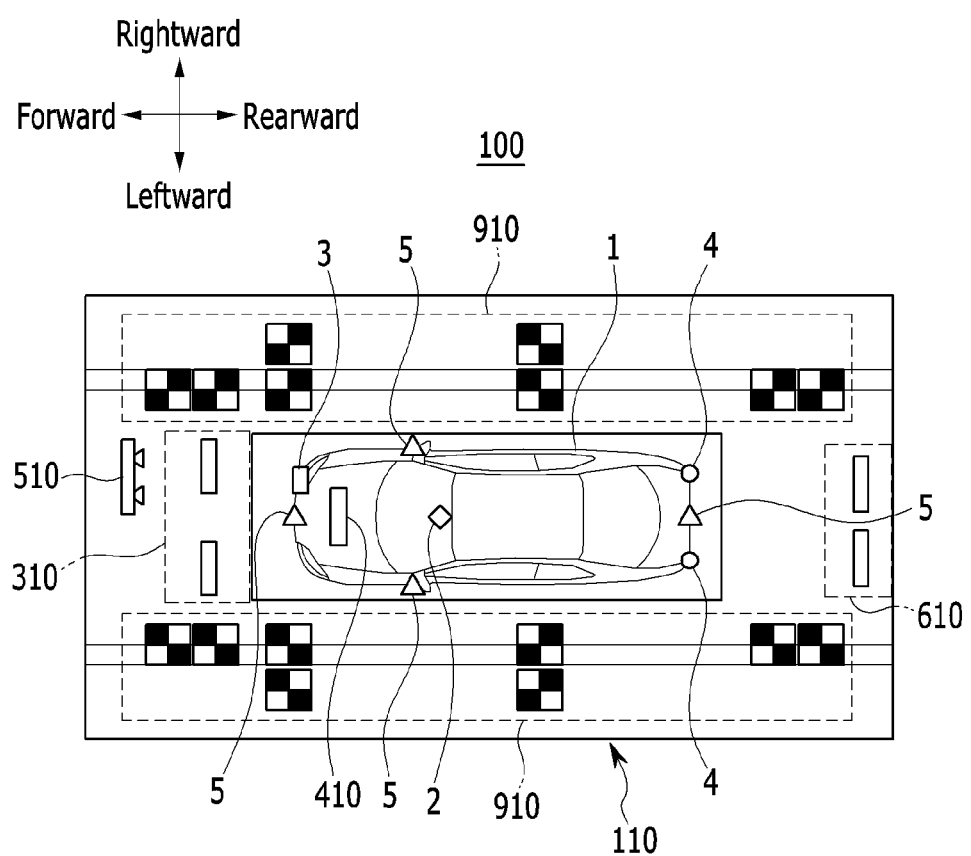
FIG. 1 is a diagram schematically illustrating an inspection device of vehicle driver assistance systems (DASs) according to an exemplary embodiment of the present invention.

The present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention.

Accordingly, the drawings and description are to be regarded as illustrative in nature and not restrictive, and like reference numerals designate like elements throughout the specification.

Because the size and thickness of each configuration shown in the drawings are arbitrarily shown for better understanding and ease of description, the present invention is not limited thereto, and the thicknesses of portions and regions are exaggerated for clarity.

Further, in the following detailed description, names of constituents, which are in the same relationship, are divided into "the first", "the second", etc., but the present invention is not necessarily limited to the order in the following description.

In addition, terms such as "unit", "means", "part", "member", etc., which are described in the specification, mean a unit of a comprehensive configuration that performs at least one function or operation.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Figure 2:
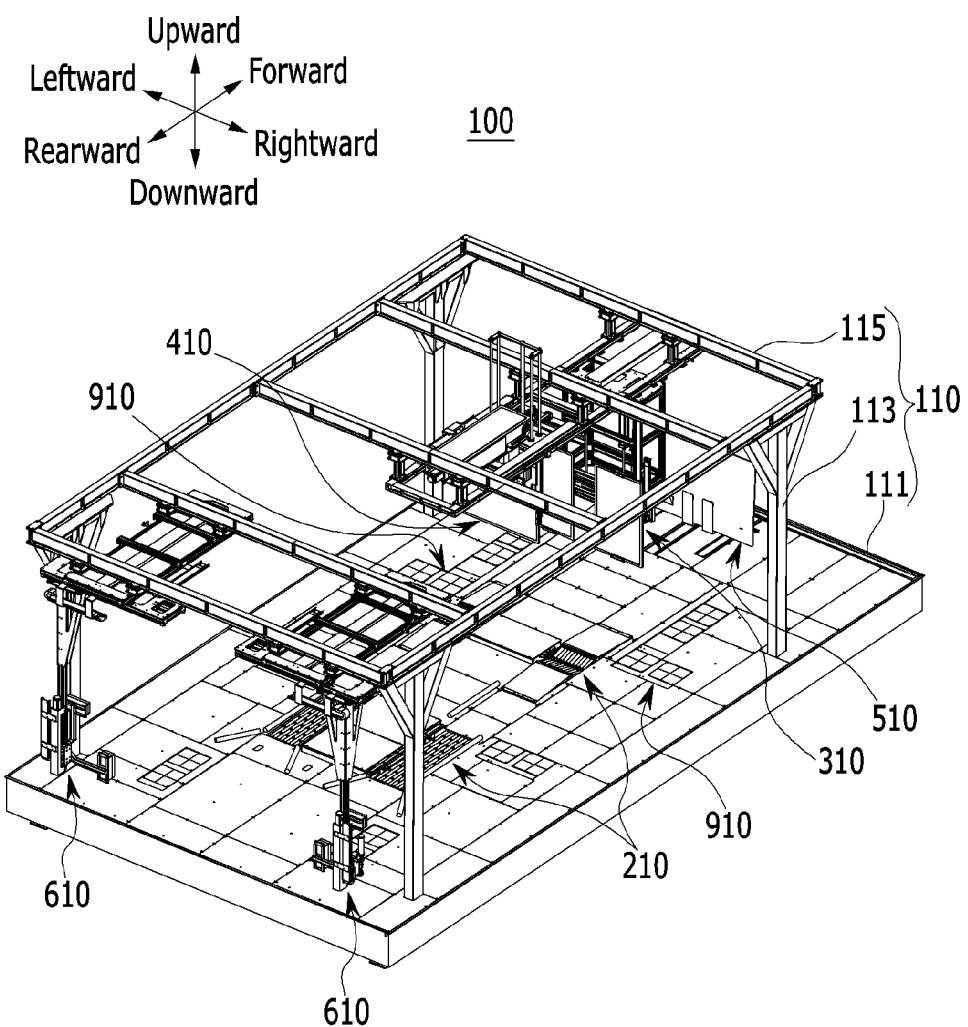
FIG. 2 is a perspective view of the inspection device of the DASs according to the exemplary embodiment of the present invention.

FIG. 1 is a block diagram schematically illustrating an inspection device of vehicle driver assistance systems (DASs) according to an exemplary embodiment of the present invention, and FIG. 2 is a perspective view of the inspection device of the DASs according to the exemplary embodiment of the present invention.

Referring to FIGS. 1 and 2, an inspection device 100 of vehicle driver assistance systems (DASs) may correct operations of various kinds of DASs mounted on a completed vehicle during vehicle assembly processes, and may be applied to a vehicle inspection line for checking normal operations of the DASs.

For example, the DASs may include a lane departure warning system (LDWS), a smart cruise control (SCC) system, a blind spot detection (BSD) system, and an around view monitoring (AVM) system.

The LDWS 2 is installed at an inner side of a windshield glass under a rear view minor of a vehicle 1 (see FIG. 1), and uses a camera to detect a driving lane on a road ahead as an image and provides an alarm sound and the like to a driver if the vehicle 1 has departed from its driving lane.

The SCC 3 is typically referred to as a cruise control system or automatic speed controller in the art.

The SCC 3 refers to a system that is mounted on a front side of the vehicle 1 and uses a radar sensor to measure an inter-vehicle distance to the vehicle in front so as to adequately maintain the inter-vehicle distance.

The BSD 4 refers to systems that are installed as a pair at opposite rear sides of the vehicle 1 and use radar sensors to detect rear blind spots of the vehicle.

The AVM 5 refers to systems in which the cameras at front/rear and left/right sides of the vehicle 1 are used to provide images in all directions of 360 degrees around the vehicle 1 to the driver.

Because the aforementioned configurations and operating mechanisms of the DASs are well-known conventional technologies, a detailed description of them will be omitted in the present specification.

Because the DASs including the LDWS 2, the SCC 3, the BSD 4, and the AVM 5 may cause accumulated tolerance while being mounted on the vehicle 1, their mount positions and measurement points should be corrected and their normal operations should be checked.

The inspection device 100 of the DAS according to the exemplary embodiment of the present invention may integrate separated correction/inspection processes of the various kinds of DASs into a single process, and has a structure in which corrections/inspections of the various kinds of DASs applied to different kinds of vehicles can be shared.

For this purpose, the inspection device 100 of the vehicle DASs includes a frame unit 110, a position aligning unit 210, an LDWS correction unit 310, an LDWS inspection unit 410, an SCC inspection unit 510, a BSD inspection unit 610, and an AVM inspection unit 910.

In the art, a transfer direction of a vehicle body is typically referred to as a T direction, a width direction of the vehicle body as an L direction, a height direction of the vehicle body as an H direction.

However, in the exemplary embodiment of the present invention, references to the directions are not set according to the LTH directions but are set as front/rear directions, left/right directions, and up/down directions of the vehicle.

As a supporting unit for various kinds of constituent elements that will be described later, the frame unit 110 includes accessory elements for supporting the constituent elements, such as various kinds of brackets, plates, housings, cases, blocks, collars, etc.

However, because the aforementioned accessory elements are for installations of the respective constituent elements in the frame unit 110, except for an exceptional case, the aforementioned accessory elements are generally referred to as the frame unit in the exemplary embodiment of the present invention.

In the exemplary embodiment of the present invention, the frame unit 110 includes a base frame 111, pillar frames 113, and an upper frame 115.

As a square-shaped frame consisting of beams and the like, the base frame 111 is installed at a bottom of an inspection workplace.

A top surface of the base frame 111 forms a flat surface with respect to a bottom surface of the inspection workplace, and the vehicle 1 may be moved forward to enter the top surface of the base frame 111 and be moved backward to exit therefrom.

The pillar frames 113 are erected at respective corner portions of the base frame 111 in a vertical direction.

The vehicle 1 may be moved forward to enter and backward to exit along the top surface of the base frame 111 between a pair of pillar frames 113 that are positioned at a rear side of the drawing.

Further, the upper frame 115 is provided as a lattice frame that connects upper end portions of the pillar frame 113 in its horizontal and vertical directions.

In the exemplary embodiment of the present invention, as an aligning apparatus for aligning the different kinds of vehicles 1 at a predetermined position, the position aligning unit 210 is installed at the base frame 111 of the frame unit 110.

In particular, for accurate correction and inspection of the DAS, the position aligning unit 210 is provided to align the front/rear and left/right directions of the vehicle 1 in accordance with wheel bases (for example, 2500-3500 mm) of different kinds of vehicles.

FIGS. 3(a) and (b) are drawings of a position aligning unit applicable to the inspection device of the DASs according to the exemplary embodiment of the present invention.

Figure 3:
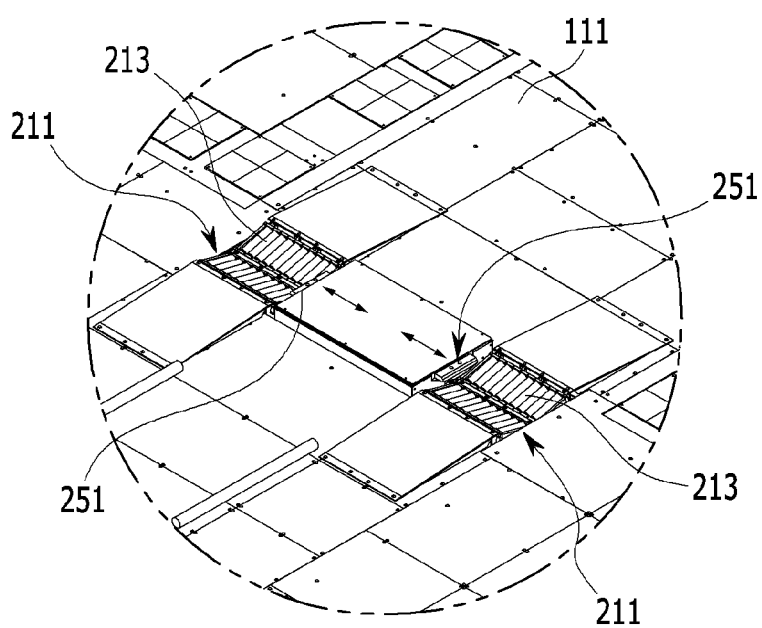
FIGS. 3(a) and (b) are drawings of a position aligning unit applicable to the inspection device of the DASs according to the exemplary embodiment of the present invention.
Figure 3:
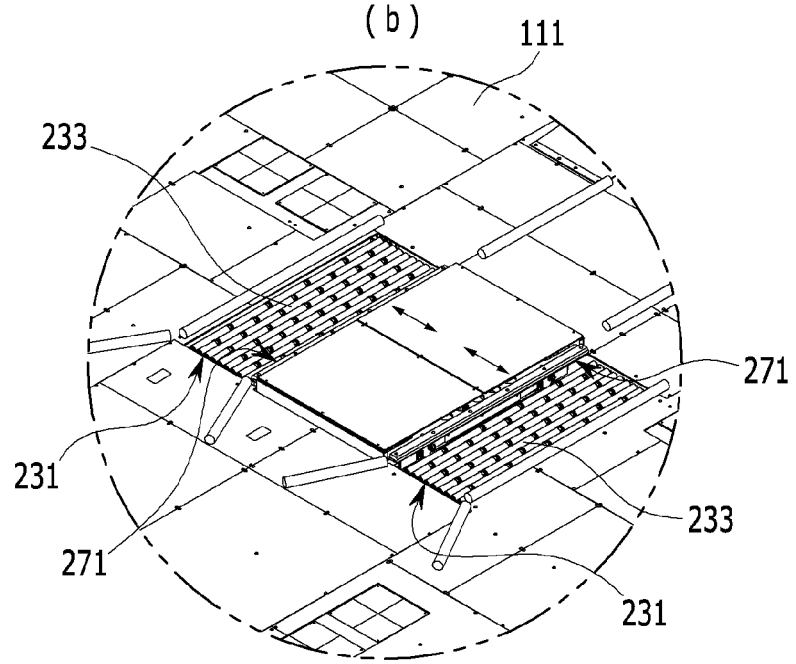

Referring to FIG. 3 in the exemplary embodiment of the present invention, the position aligning unit 210 may include a front wheel stopper 211 and a rear wheel supporting unit 231 that align the position of the vehicle 1 in the front/rear directions, and a front wheel pusher 251 and a rear wheel pusher 271 that align the position of the vehicle 1 in the left/right directions.

The front wheel stopper 211 includes a plurality of first free rollers 213, which face each other in the front/rear directions of the base frame 111 to be respectively slantedly installed.

The first free rollers 213 support front wheels of the vehicle 1 and determine the position of the vehicle 1 in the front/rear directions thereof.

The first free rollers 213 are installed at the base frame 111 such that they are freely rotatable in the left/right directions of the vehicle 1.

The rear wheel-supporting units 231 are provided to support rear wheels of the vehicle 1, and include second free rollers 233 that are disposed in the base frame 111 in a planar direction thereof along the front/rear directions of the vehicle 1.

The second free rollers 233 are installed at the base frame 111 such that they are freely rotatable in the left/right directions of the vehicle 1.

The front wheel pushers 251 are provided to align the position of the front wheels in both directions (the left/right directions), and are installed at the base frame 111 between the first free rollers 213 corresponding to the respective front wheels of the vehicle 1.

As a pair, these front wheel pushers 251 are respectively moved in the left/right directions by an actuating cylinder disposed therewithin (not shown in the drawing), and align the position of the front wheels of the vehicle 1 in both directions (the left/right directions).

In particular, when the front wheel pushers 251 are moved in the left/right directions in accordance with the respective front wheels of the vehicle 1, the front wheels are moved in the left/right directions by the first free rollers 213 such that the position of the front wheels of the vehicle 1 is aligned in the left/right directions.

The rear wheel pushers 271 are provided to align the position of the rear wheels in both directions (the left/right directions), and are installed at the base frame 111 between the second free rollers 233 corresponding to the respective front wheels of the vehicle 1.

As a pair, the front wheel pushers 271 are respectively moved in the left/right directions by the actuating cylinder (not shown in the drawing), and align the position of the rear wheels of the vehicle 1 in both directions (the left/right directions).

In particular, when the front wheel pushers 271 are moved in the left/right directions in accordance with the respective rear wheels of the vehicle 1, the rear wheels of the vehicle 1 are moved in the left/right directions by the second free rollers 233 such that the position of the rear wheels of the vehicle 1 is aligned in the left/right directions.

Referring to FIGS. 1 and 2, in the exemplary embodiment of the present invention, the LDWS correction unit 310 is provided to correct a camera measurement point of the LDWS 2 that is provided in the front side of the vehicle 1.

In particular, because the LDWS 2 is installed at the inner side of the windshield glass under the rear view mirror of the vehicle 1, the LDWS correction unit 310 is provided to correct the camera measurement point of the LDWS 2 in accordance with accumulated tolerance due to assembly of the windshield glass with respect to the vehicle body and assembly of the LDWS 2 with respect to the windshield glass.

The LDWS correction unit 310 is installed at the upper frame 115 of the frame unit 110 such that it is reciprocally movable in accordance with the front side of the vehicle, in multi-axis directions, and displays virtual correction targets 323 (hereinafter refer to FIG. 4) as images with respect to the camera of the LDWS 2.

Figure 4:
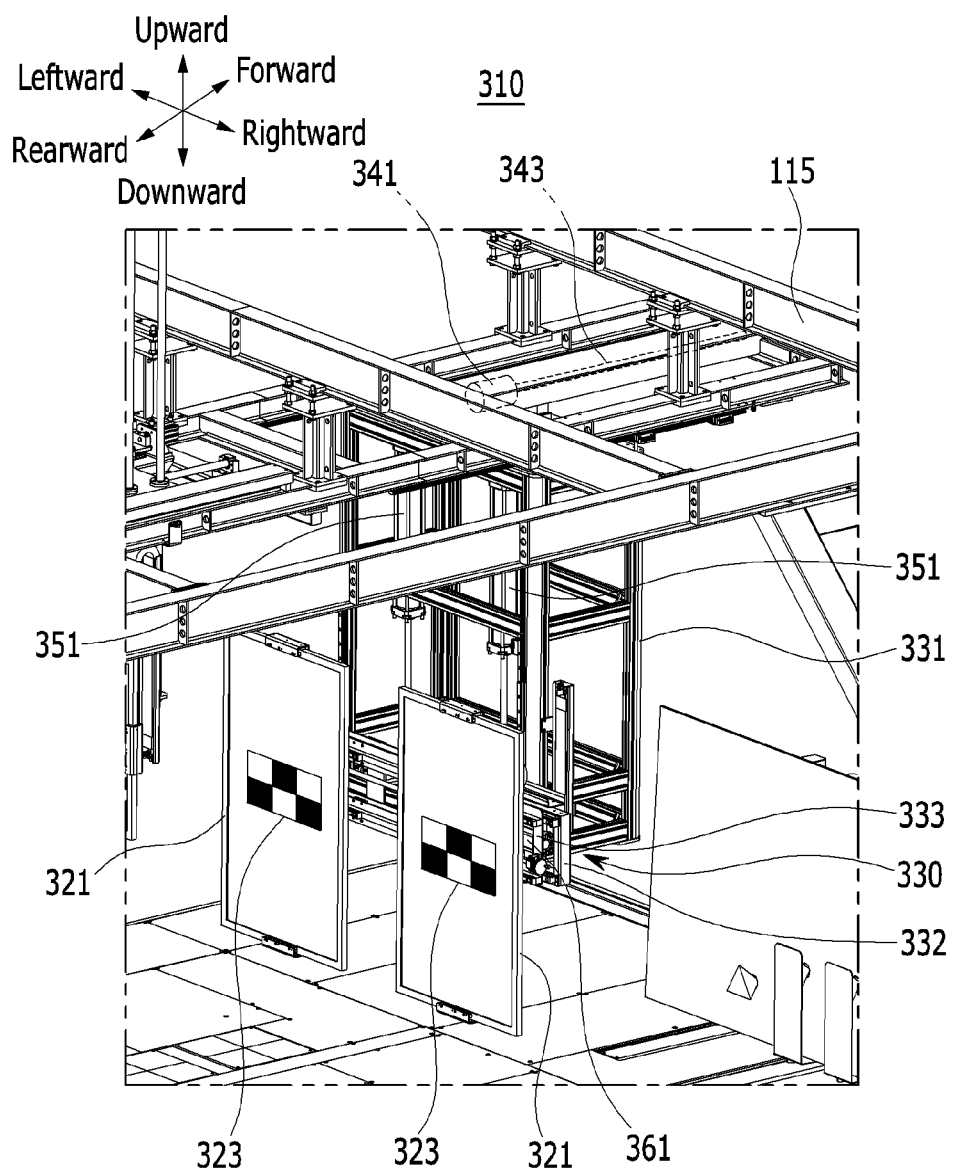
FIGS. 4 and 5 are drawings of an LDWS correction unit applicable to the inspection device of the DASs according to the exemplary embodiment of the present invention.
Figure 5:
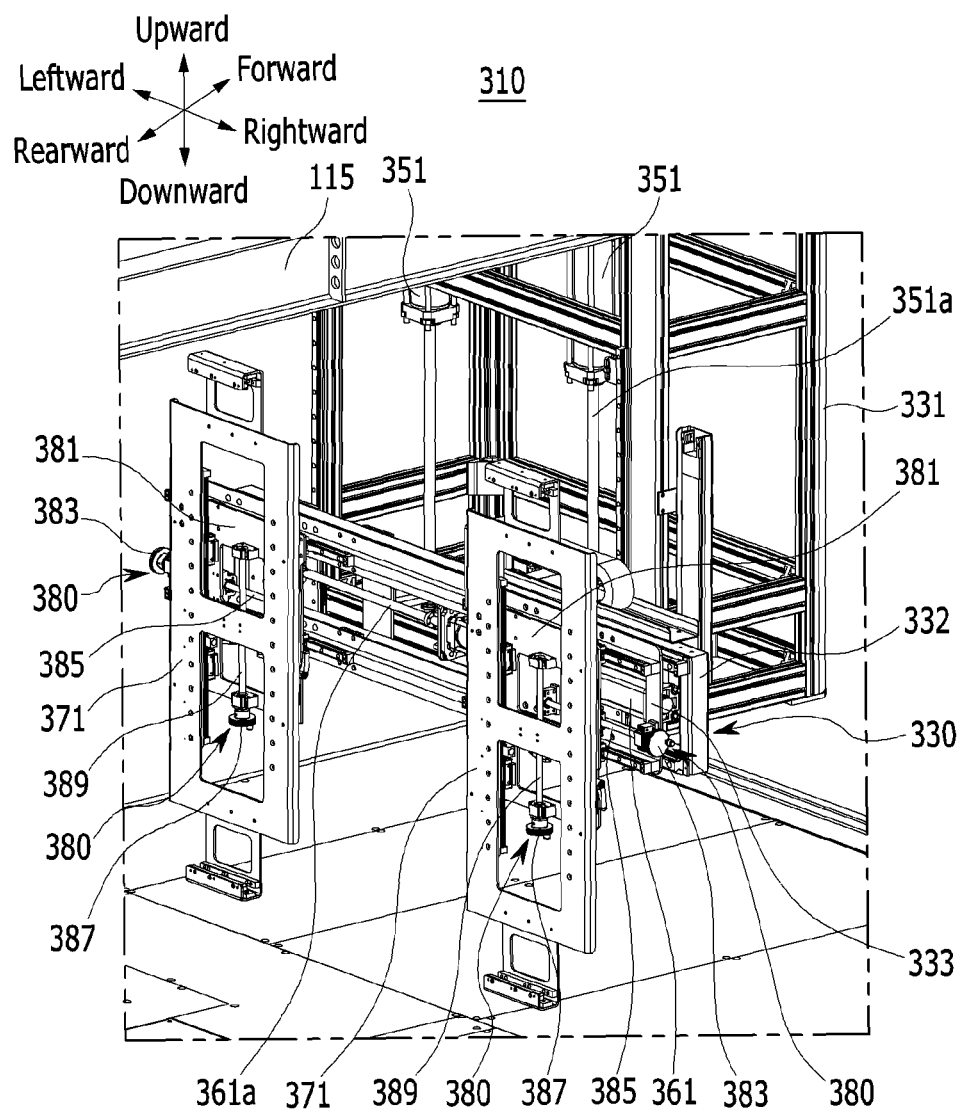

FIGS. 4 and 5 are drawings of an LDWS correction unit applicable to the inspection device of the DASs according to the exemplary embodiment of the present invention.

Referring to FIGS. 4 and 5, in the exemplary embodiment of the present invention, the LDWS correction unit 310 includes a pair of first LCD monitors 321 that are installed at the upper frame 115 according to a predetermined position to be movable in the front/rear, the left/right, and the up/down directions, in accordance with an aimer upper end of the head lamp of the vehicle 1.

The first LCD monitor 321 displays correction targets 323 as the images to correct the camera measurement point of the LDWS 2, and may adjust position and size of the correction targets 323 using the image controller of the disclosed technology.

In this case, the first LCD monitor 321 may be installed at the upper frame 115 such that it is reciprocally movable in the front/rear, the left/right, and the up/down directions by a first moving unit 330.

The first moving unit 330 includes a first moving frame 331, a second moving frame 332, and a third moving frame 333.

The first moving frame 331 is installed at the upper frame 115 such that it is slidingly moveable through a guiding apparatus or sliding apparatus in the front/rear directions.

The second moving frame 332 is installed at the first moving frame 331 such that it is slidingly moveable through the guiding apparatus or sliding apparatus in the up/down directions.

In addition, the third moving frame 333 is installed at the second moving frame 332 such that it is slidingly moveable through the guiding apparatus or sliding apparatus in the left/right directions.

In this case, the pair of first LCD monitors 321 described above may be installed at the third moving frame 333 such that they are spaced apart from each other in the left/right directions.

Meanwhile, the first moving frame 331 may be reciprocally moved back-and-forth with respect to the upper frame 115 by a servo motor 341 and a lead screw 343.

The servo motor 341 is installed such that it is fixed to the upper frame 115.

The lead screw 343 is coupled to a driving shaft of the servo motor 341, and is installed at the upper frame 115 such that it is rotatable with respect thereto.

In this case, the lead screw 343 is screw-fixed to a separate block that is fixed to the first moving frame 331.

The second moving frame 332 may be reciprocally moved upwardly and downwardly with respect to the first moving frame 331 by a pair of vertical actuating cylinders 351.

The vertical actuating cylinders 351 are disposed along the up/down directions and are fixedly installed at the first moving frame 331.

In this case, an operating rod of the vertical actuating cylinder 351 is coupled to the second moving frame 332.

In addition, the third moving frame 333 may be reciprocally moved in the left/right direction with respect to the second moving frame 332 by a single horizontal actuating cylinder 361.

The horizontal actuating cylinder 361 is disposed along the left/right directions and is fixedly installed at the second moving frame 332.

In this case, an operating rod of the horizontal actuating cylinder 361 is coupled to the third moving frame 333.

Meanwhile, the first LCD monitors 321 may be respectively installed as a pair in the third moving frame 333 through mounting brackets 371, such that their positions are manually adjustable through a minute adjustment unit 380 in the left/right and the up/down directions with respect to the third moving frame 333.

The aforementioned minute adjustment unit 380 includes a pair of moving brackets 381, which are installed through the guiding apparatus or sliding apparatus such that it is moved in the left/right directions with respect to the third moving frame 333.

The aforementioned mounting bracket 371 may be installed at each of the moving brackets 381 such that it is moved in the up/down directions through the guiding apparatus or sliding apparatus.

In addition, the minute adjustment unit 380, as a moving means for moving the moving bracket 381 in the left/right directions, is installed through a first handwheel 383 such that it is rotatable with respect to the third moving frame 333, and includes a first lead screw member 385 that is screw-fixed to a separate block fixed to the moving bracket 381.

Further, the minute adjustment unit 380, as a moving means for moving the mounting bracket 371 in the up/down directions, is installed through a second handwheel 387 such that it is rotatable with respect to the moving bracket 381, and includes a second lead screw member 389 that is screw-fixed to a separate block fixed to the mounting bracket 371.

Thus, in a state where the vehicle 1 is aligned at the predetermined position by the position aligning unit 210, the pair of first LCD monitors 321 are moved in the front/rear, the left/right, and the up/down directions with respect to the upper frame 115, such that they are positioned above a head lamp aimer of the vehicle 1.

Further, in the exemplary embodiment of the present invention, the pair of first LCD monitors 321 are manually moved by the minute adjustment unit 380 in the left/right and the up/down directions, such that the positions of the first LCD monitors 321 are minutely adjusted.

On the other hand, the pair of first LCD monitors 321 respectively regenerate a single correction target 323 to correct a camera measurement point of the LDWS 2 as images, and may adjust position and size of the image of the correction target 323 through two correction target types.

Alternatively, in the exemplary embodiment of the present invention, the pair of first LCD monitors 321 are used to correct a camera measurement point of the LDWS 2 through a single correction target type.

For this purpose, in the exemplary embodiment of the present invention, in a state where the pair of first LCD monitors 321 are moved in the left or right direction by the aforementioned first moving unit 330, the single correction target 323 with respect to the LDWS 2 may be displayed only on one of the first LCD monitors 321.

Referring to FIGS. 1 and 2, in the exemplary embodiment of the present invention, the LDWS inspection unit 410 is provided to check the normal operation of the aforementioned LDWS 2.

In particular, the LDWS inspection unit 410 is configured to check if alarm sounds or alarm displays are appropriately provided to the driver while normally recognizing a driving lane and detecting lane departure of the vehicle 1 through the camera of the LDWS 2.

The LDWS inspection unit 410 is installed at the upper frame 115 of the frame unit 110 such that it is reciprocally movable in accordance with the front side of the vehicle 1 in multi-axis directions, and displays a virtual driving lane 411 (hereinafter refer to FIG. 6) with respect to the camera of the LDWS 2 as images.

Figure 6:
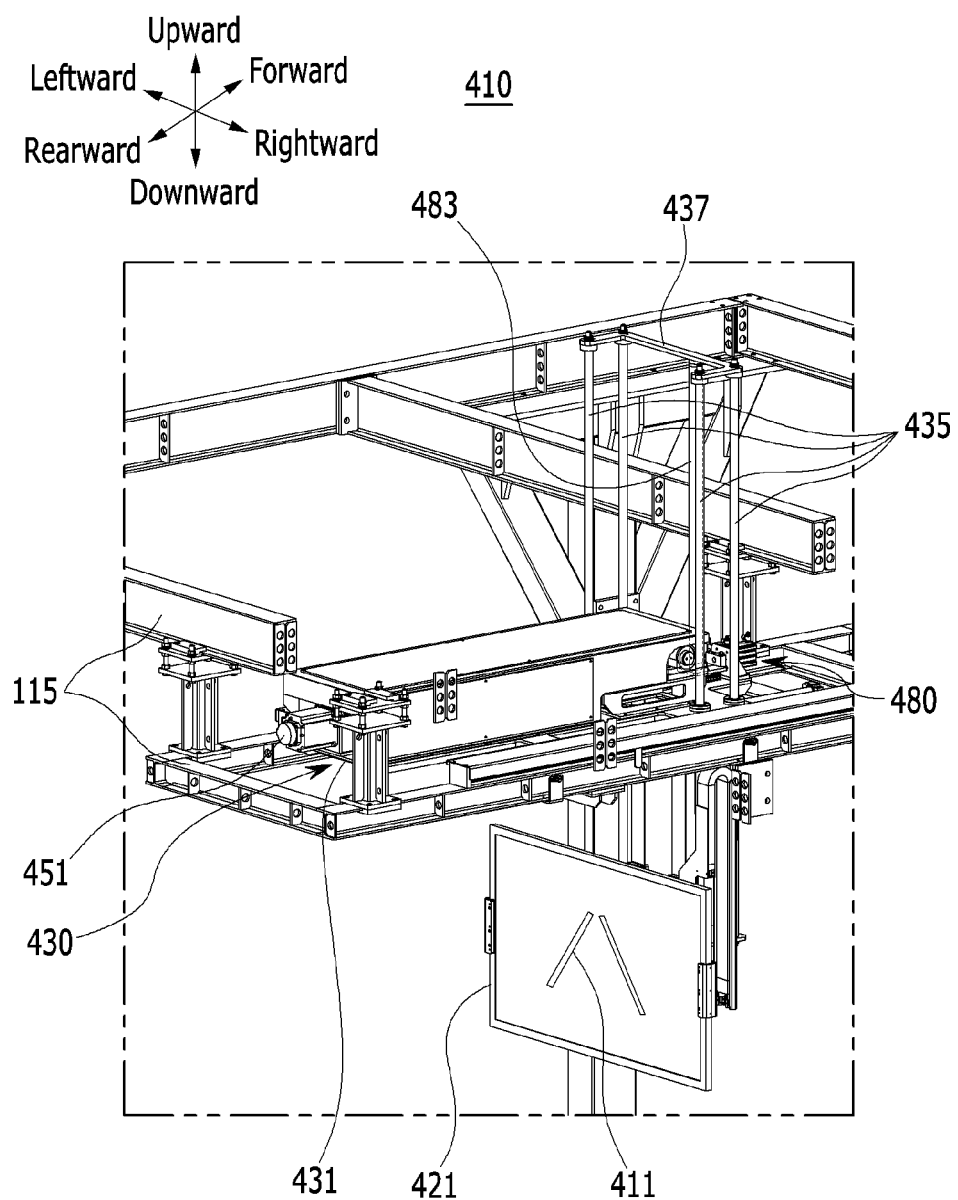
FIGS. 6 and 7 are drawings of an LDWS inspection unit applicable to the inspection device of the DASs according to the exemplary embodiment of the present invention.
Figure 7:
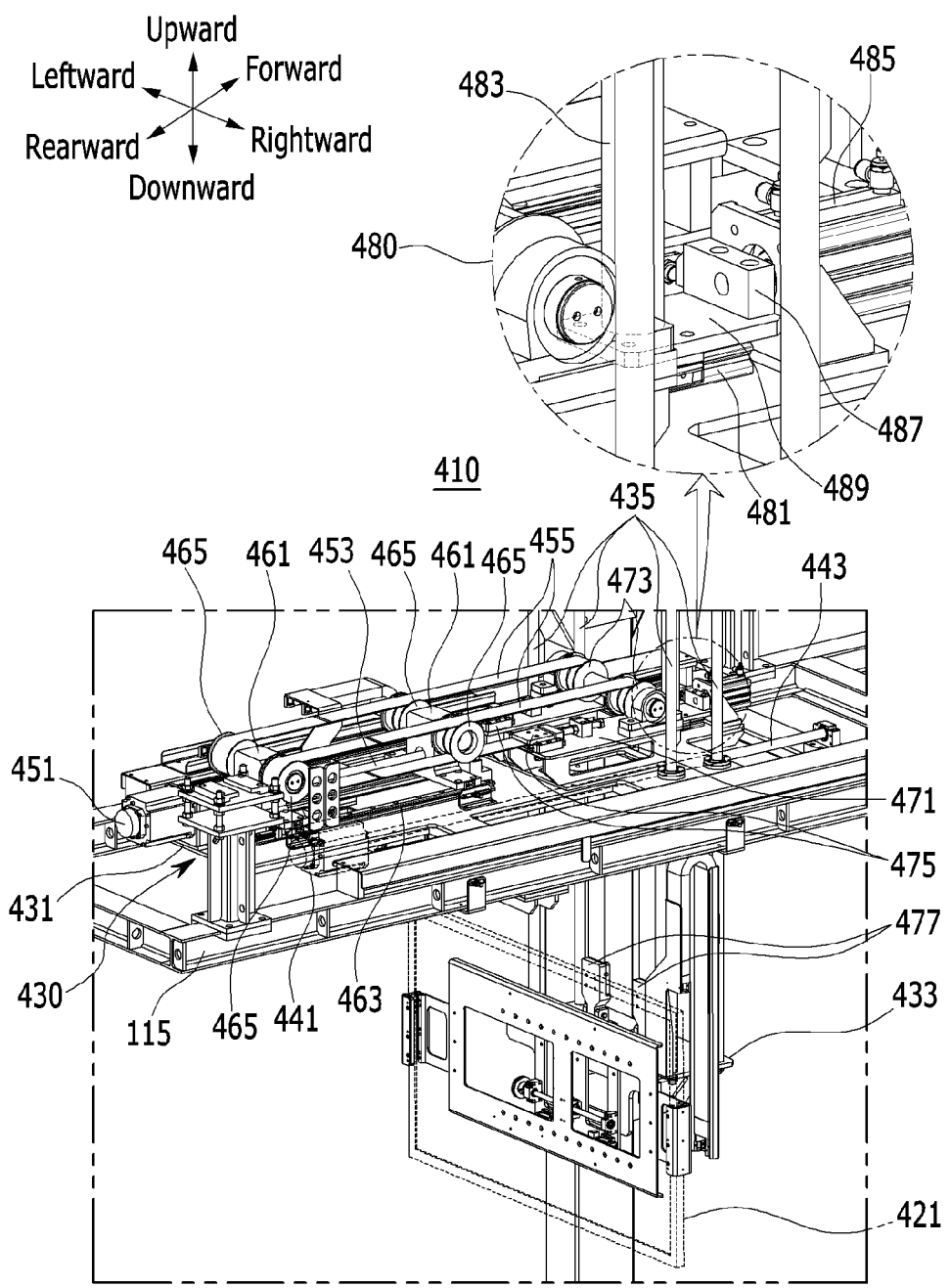

FIGS. 6 and 7 are drawings of an LDWS inspection unit applicable to the inspection device of the DASs according to the exemplary embodiment of the present invention.

Referring to FIGS. 6 and 7, in the exemplary embodiment of the present invention, the LDWS inspection unit 410 includes a single second LCD monitor 421, which is installed at the upper frame 115 such that it is movable in accordance with the front side of the vehicle 1 in the front/rear and the up/down directions according to the predetermined position of the vehicle 1.

The second LCD monitor 421 visualizes and displays the driving lane 411, which is an inspection target for inspecting the normal operation of the LDWS 2, and may adjust position and size of the driving lane 411 using the image controller of the disclosed technology.

In this case, the second LCD monitor 421 may adjust the image of the driving lane 411 in the left/right and the up/down directions using the image controller.

In this case, the second LCD monitor 421 may be installed such that it is reciprocally moved in the front/rear and the up/down directions with respect to the upper frame 115 by a second moving unit 430.

The second moving unit 430 includes a forward/backward moving member 431 and a vertical moving member 433.

The forward/backward moving member 431 has a plate shape, and is provided such that it is slidingly moveable with respect to the upper frame 115 in the front/rear directions through the guiding apparatus or sliding apparatus.

The vertical moving member 433 is guided by a plurality of guide rods 435 to the forward/backward moving member 431 and is installed such that it is reciprocally movable in the up/down directions.

The guide rods 435 penetrate the forward/backward moving member 431 in the up/down directions, and may be coupled to the vertical moving member 433.

In this case, the aforementioned single second LCD monitor 421 is installed at the vertical moving member 433.

Lower end portions of the guide rods 435 are fixed to the vertical moving member 433.

Upper end portions of the guide rods 435 may be coupled to each other through a connection bracket 437.

Meanwhile, the forward/backward moving member 431 may be reciprocally moved in the front/rear directions with respect to the upper frame 115 by a servo motor 441 and a lead screw 443.

The servo motor 441 is fixedly installed at the upper frame 115.

The lead screw 443 is disposed in the upper frame 115 along the front/rear directions and is coupled to a driving shaft of the servo motor 441, and is installed such that it is rotatable with respect to the upper frame 115 through bearings.

In this case, the lead screw 443 is screw-fixed to a separate block that is fixed to the forward/backward moving member 431.

On the other hand, the vertical moving member 433 may be reciprocally moved in the up/down directions with respect to the forward/backward moving member 431 by a servo motor 451, a lead screw 453, and belts 455.

The servo motor 451 is fixedly installed at a top surface of the forward/backward moving member 431.

The lead screw 453 described above is installed at the driving shaft of the servo motor 451 along the front/rear directions, and the lead screw 453 is installed on the top surface of the forward/backward moving member 431 such that it is rotatable through bearings and the like.

In addition, a pair of moving bodies 461 are screw-fixed to the lead screw 453 while being spaced apart from each other, and the moving bodies 461 may be coupled such that they are slidingly moveable along a guide rail 463 on the forward/backward moving member 431 in the front/rear directions.

A pair of belt pulleys 465 are installed at each of the moving bodies 461 such that they are freely rotatable.

A fixed body 471 is fixedly installed at the top surface of the forward/backward moving member 431 in accordance with the pair of moving bodies 461.

A pair of belt pulleys 473 are installed at the fixed body 471 such that they are freely rotatable.

In this case, the pair of moving bodies 461 and the fixed body 471 described above are sequentially disposed from a front side of the forward/backward moving member 431 toward a rear side thereof.

The belts 455 are provided to move the second LCD monitor 421 installed at the vertical moving member 433 in the up/down directions, and are coupled as a pair to the moving bodies 461 and the belt pulleys 465 and 473 of the fixed body 471 such that they are respectively operable thereto.

In this case, one end portion of the belt 455 is fixed to the fixed body 471 through a first fixing member 475, while the other end portion thereof is fixed to the vertical moving member 433 through a second fixing member 477.

Further, on the other hand, in the exemplary embodiment of the present invention, as the second LCD monitor 421 installed at the vertical moving member 433 is moved in the up/down directions by the belt 455, the second LCD monitor 421 may fall down along with the vertical moving member 433 due to separation of the vertical moving member 433 from the belt 455.

In order to prevent this, in the exemplary embodiment of the present invention, a stopping unit 480 is further included to restrict (stop) the vertical moving member 433 when the upward/downward movement of the second LCD monitor 421 is completed by the belt 455.

The stopping unit 480 includes a stopping bar 483, which is installed on the top surface of the forward/backward moving member 431 through a guide rail 481 at a rear side of the aforementioned fixed body 471 such that it is movable in the front/rear directions.

The stopping bar 483 serves to selectively restrict the connection bracket 437 that connects the upper end portions of the guide rods 435.

In this case, the stopping bar 483 may be moved along the guide rail 481 in the front/rear directions by a stopping cylinder 485, which is fixedly installed on the top surface of the forward/backward moving member 431.

Thus, the stopping bar 483 may or may not restrict the connection bracket 437 through its upper end portion.

In particular, a connection block 487 is coupled to an operating rod of the stopping cylinder 485, and the connection block 487 is coupled to a flange 489 of the lower end portion of the stopping bar 483.

Thus, the stopping cylinder 485 may move its operating rod in the front/rear directions so as to move the stopping bar 483 in the front/rear directions along the guide rail 481. When the stopping bar 483 is positioned under the connecting bracket 487, movement to downward of the connecting bracket 487 may be restricted.

Referring to FIGS. 1 and 2, in the exemplary embodiment of the present invention, the SCC inspection unit 510 is provided to correct a measurement point of the SCC 3 provided at the front side of the vehicle 1 and to check the normal operation of the SCC 3.

In particular, because the SCC 3 is installed at a FEM module at the front side of the vehicle 1, the SCC inspection unit 510 is provided to correct a measurement point of the SCC 3 for measuring an inter-vehicle distance and to check the normal operation of the SCC 3 in accordance with accumulated tolerance due to assembly of the FEM module with respect to the vehicle body and assembly of the SCC 3 with respect to the FEM module.

Figure 8:
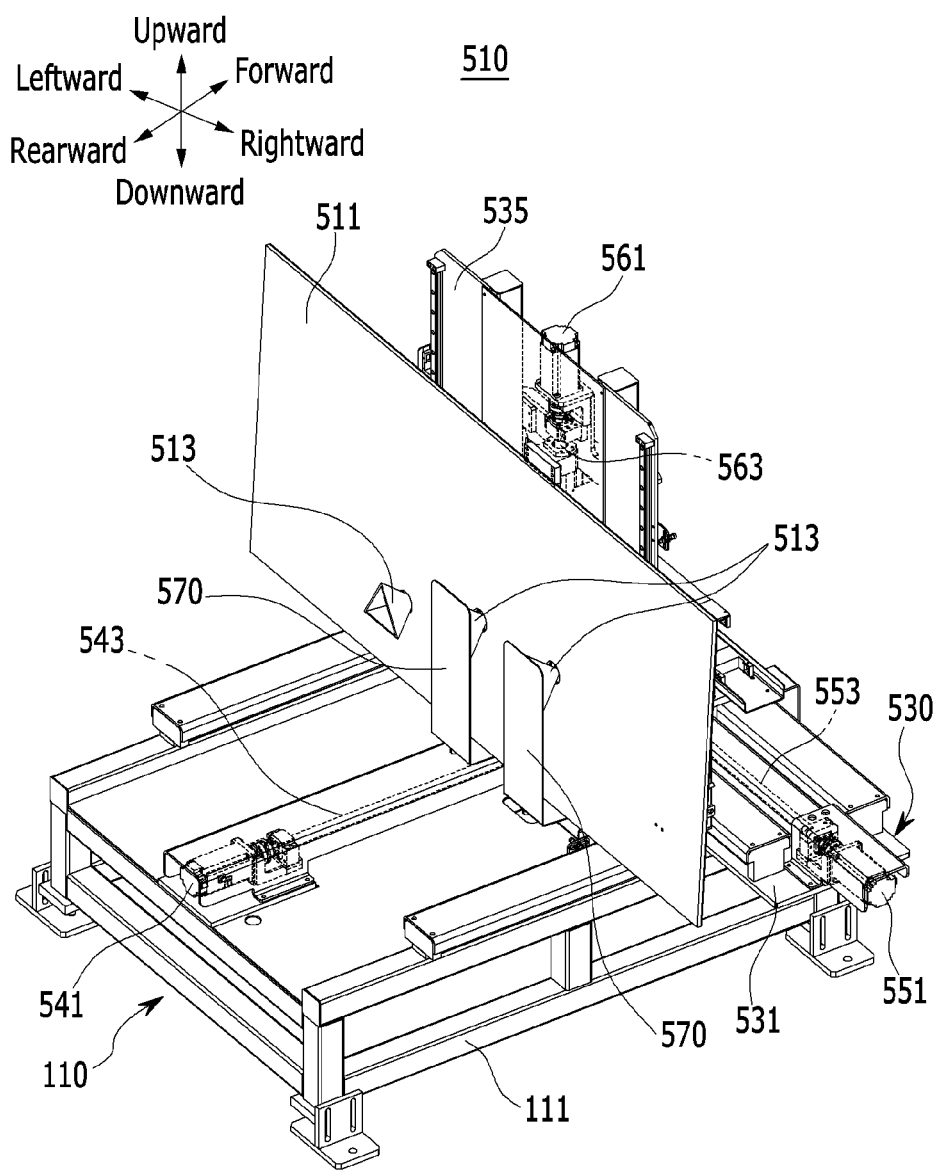
FIGS. 8 to 10 are drawings of an SCC inspection unit applicable to the inspection device of the DASs according to the exemplary embodiment of the present invention.
Figure 9:
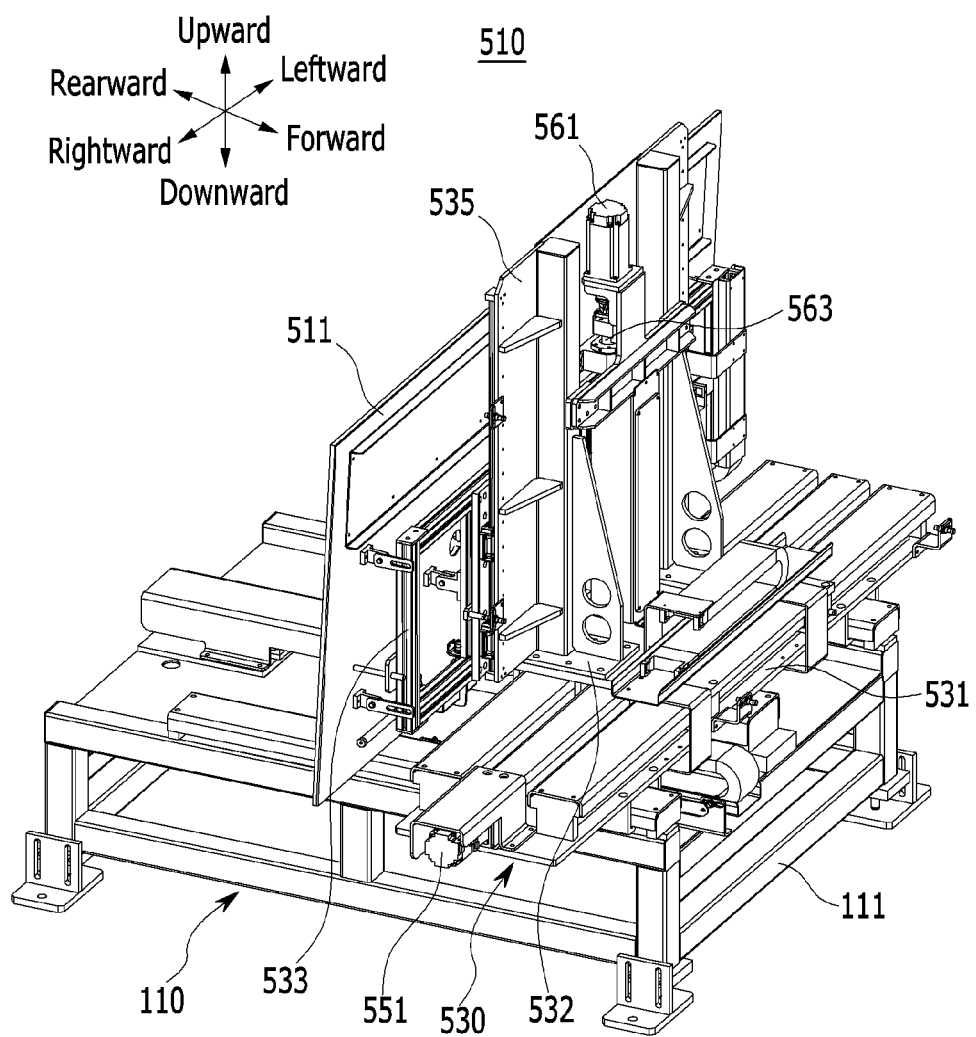
Figure 10:
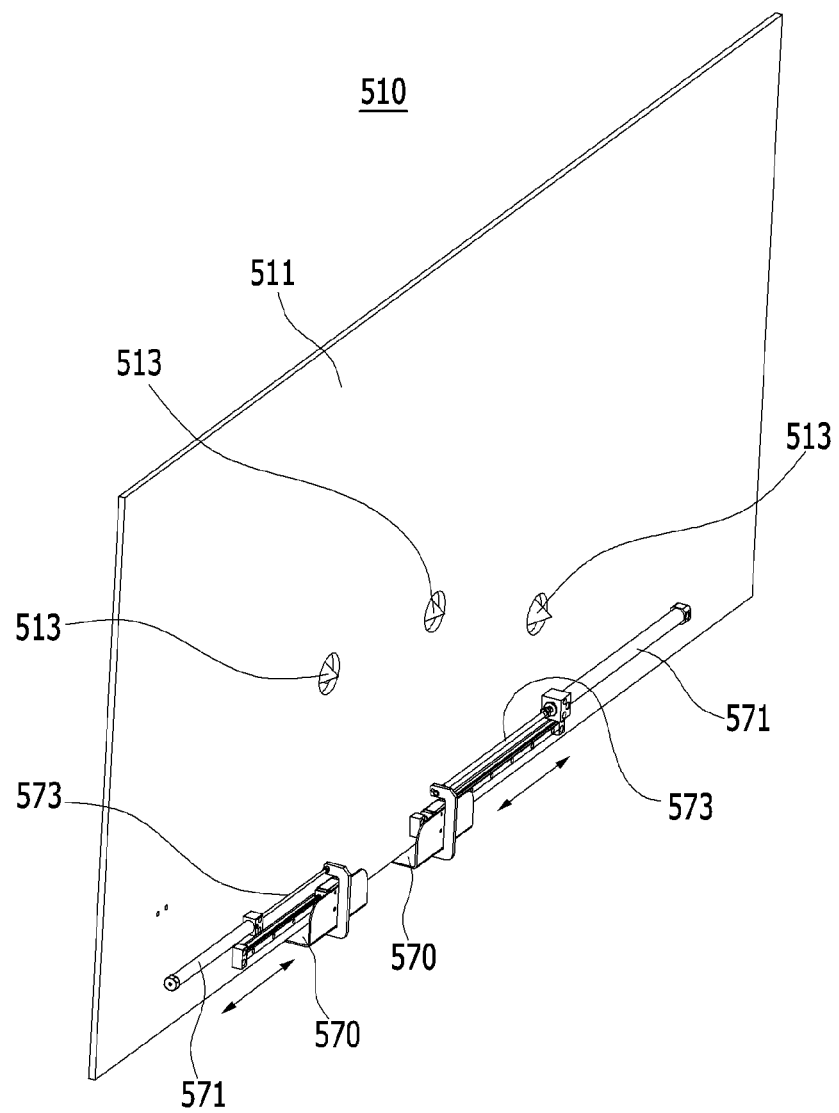

FIGS. 8 to 10 are drawings of an SCC inspection unit applicable to the inspection device of the DASs according to the exemplary embodiment of the present invention.

Referring to FIGS. 8 to 10, in the exemplary embodiment of the present invention, the SCC inspection unit 510 includes a first target member 511, which is installed at the base frame 111 of the frame unit 110 such that it is movable in accordance with the front side of the vehicle 1 in multi-axis directions according to a predetermined position of the vehicle 1.

The first target member 511 is provided as an electric wave absorption plate, and three first radar reflectors 513 may be disposed at a front surface of the first target member 511 along an obliquely upward direction.

The first radar reflector 513 is typically referred to as a corner reflector in the art, and serves to reflect radar signals outputted from the SCC 3 and to input the reflected radar signals to the SCC 3.

In particular, in the exemplary embodiment of the present invention, a difference between a transmitted value of the radar signal outputted from the SCC 3 and a received value of the radar signal reflected from the first radar reflector 513 to be received through the SCC 3 are calculated to correct the measurement point of the SCC 3 and to check the normal operation of the SCC 3.

Meanwhile, the first target member 511 may be installed through a third moving unit 530 such that it is movable in the front/rear, the left/right, and the up/down directions with respect to the base frame 111.

The third moving unit 530 includes a first moving member 531, a second moving member 532, and a third moving member 533.

The first moving member 531 has a plate shape and is installed through the guiding apparatus or sliding apparatus such that it is moveable in the front/rear directions with respect to the base frame 111.

The second moving member 532 has a plate shape and is installed through the guiding apparatus or sliding apparatus such that it is moveable in the left/right directions with respect to the first moving member 531.

The third moving member 533 has a frame shape and is installed through the guiding apparatus or sliding apparatus such that it is moveable in the up/down directions with respect to the second moving member 532.

In this case, the first target member 511 including the three first radar reflectors 513 the third moving member 533 are installed at the third moving member 533.

On the other hand, the first moving member 531 may be reciprocally moved in the front/rear directions with respect to the base frame 111 by a first servo motor 541 and a first lead screw 543.

The first servo motor 541 is fixedly installed at the base frame 111.

The first lead screw 543 is disposed along the front/rear directions of the base frame 111, coupled to a driving shaft of the first servo motor 541, and installed to be rotatable with respect to the base frame 111.

In this case, the first lead screw 543 is screw-fixed to a separate block that is fixed to the first moving member 531.

The second moving member 532 may be reciprocally moved in the left/right directions with respect to the moving member 531 by a second servo motor 551 and a second lead screw 553.

The second servo motor 551 is fixedly installed at the first moving member 531.

The second lead screw 553 is disposed along the left/right directions of the first moving member 531, coupled to a driving shaft of the second servo motor 551, and installed to be rotatable with respect to the first moving member 531.

In this case, the second lead screw 553 is screw-fixed to a separate block that is fixed to the second moving member 532.

In this case, a connecting member 535 is provided to be upwardly coupled to the second moving member 532, and the third moving member 533 may be installed at the connecting member 535 through the guiding apparatus or sliding apparatus such that it is reciprocally movable in the up/down directions.

The third moving member 533 may be reciprocally moved in the up/down directions with respect to the connecting member 535 of the second moving member 532 by a third servo motor 561 and a third lead screw 563.

The third servo motor 561 is fixedly installed at the connecting member 535.

The third lead screw 563 is disposed along the up/down directions of the connecting member 535, coupled to a driving shaft of the third servo motor 561, and installed to be rotatable with respect to the connecting member 535.

In this case, the third lead screw 563 is screw-fixed to a separate block of the third moving member 533.

On the other hand, the SCC inspection unit 510 according to the exemplary embodiment of the present invention further includes a blocking member 570 that blocks remaining ones excluding any one of three first radar reflectors 513 or the any one of the three first radar reflectors 513.

The blocking member 570 blocks one of the first radar reflectors 513, and the other two first radar reflectors 513 may be applicable to a method for checking the correction and the normal operation of the SCC 3.

Alternatively, the blocking member 570 may block two first radar reflectors 513, and one first radar reflector 513 may be applicable to a method for checking the correction and the normal operation of the SCC 3.

In this case, provided as a pair and installed at the first target member 511 such that they are movable in the left/right directions with respect thereto, the blocking members 570 may be positioned at the front side of the first target member 511 and be elongated under the first target member 511 toward the third moving member 533.

Each of the blocking members 570 may be coupled such that its elongated portion is reciprocally slidingly movable with respect to a lower portion of a rear side of the target member 511 along the left/right directions.

Further, in the exemplary embodiment of the present invention, as a moving means for moving the respective blocking members 570 in the left/right directions, actuating cylinders 571 are fixedly installed at the lower portion of the rear side of the target member 511 in accordance with the respective blocking members 570.

The actuating cylinders 571 are disposed at the lower portion of the rear side of the target member 511 in the left/right directions, and operating rods 573 of the actuating cylinders 571 may be coupled to the elongated portion of the blocking member 570.

Referring to FIGS. 1 and 2, in the exemplary embodiment of the present invention, the BSD inspection unit 610 may be provided to correct measurement points of the BSDs 4 at both rear sides of the vehicle 1 and to check the normal operations of the BSDs 4.

In particular, because the BSDs 4 are respectively installed at both lateral sides of a rear bumper back panel of the vehicle 1, the BSD inspection unit 610 is provided to correct measurement points of the BSDs 4 for detecting blind spots at the rear side of the vehicle 1 through radar sensors and to check the normal operations of the BSDs 4 in accordance with accumulated tolerance due to assembly of the rear bumper with respect to the vehicle body and assembly of the SCC 3 with respect to the rear bumper.

Figure 11:
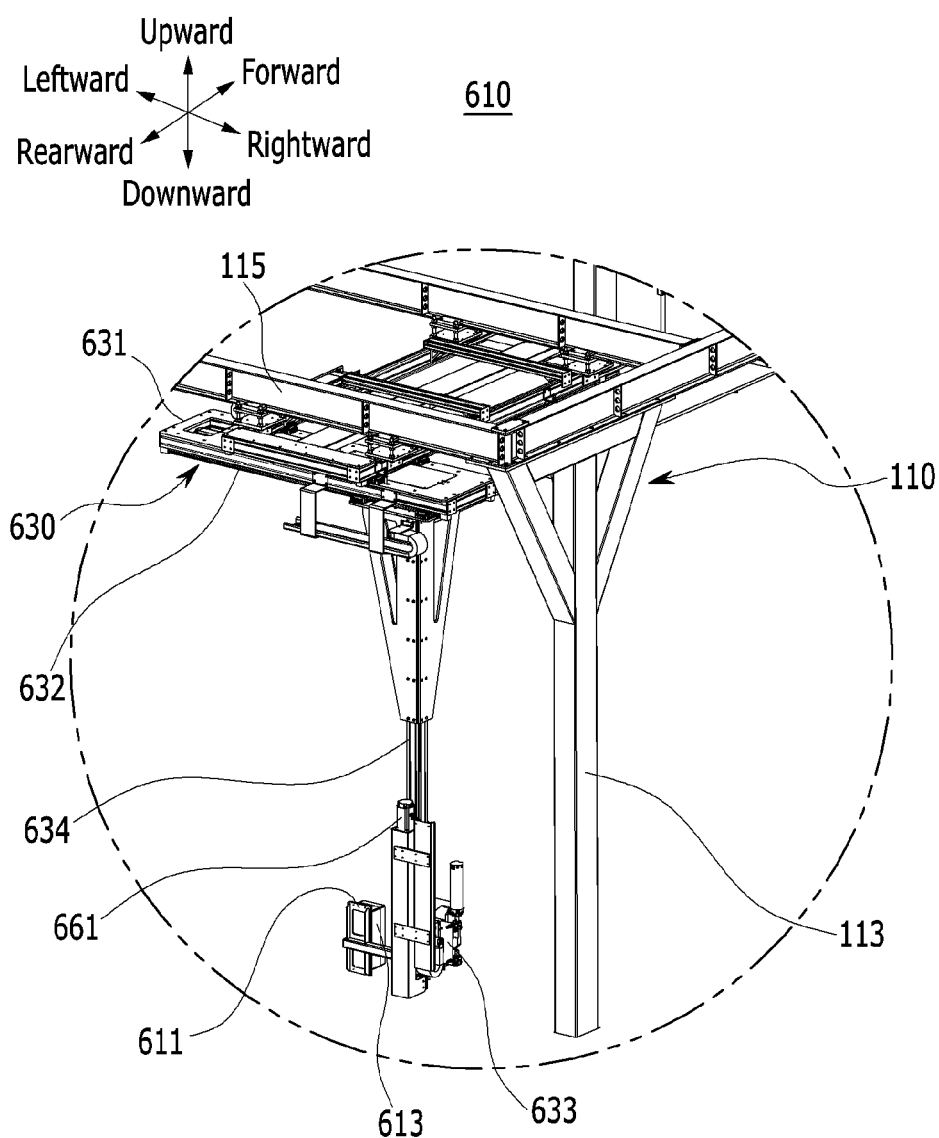
FIGS. 11 to 13 are drawings of a BSD inspection unit applicable to the inspection device of the DASs according to the exemplary embodiment of the present invention.
Figure 12:
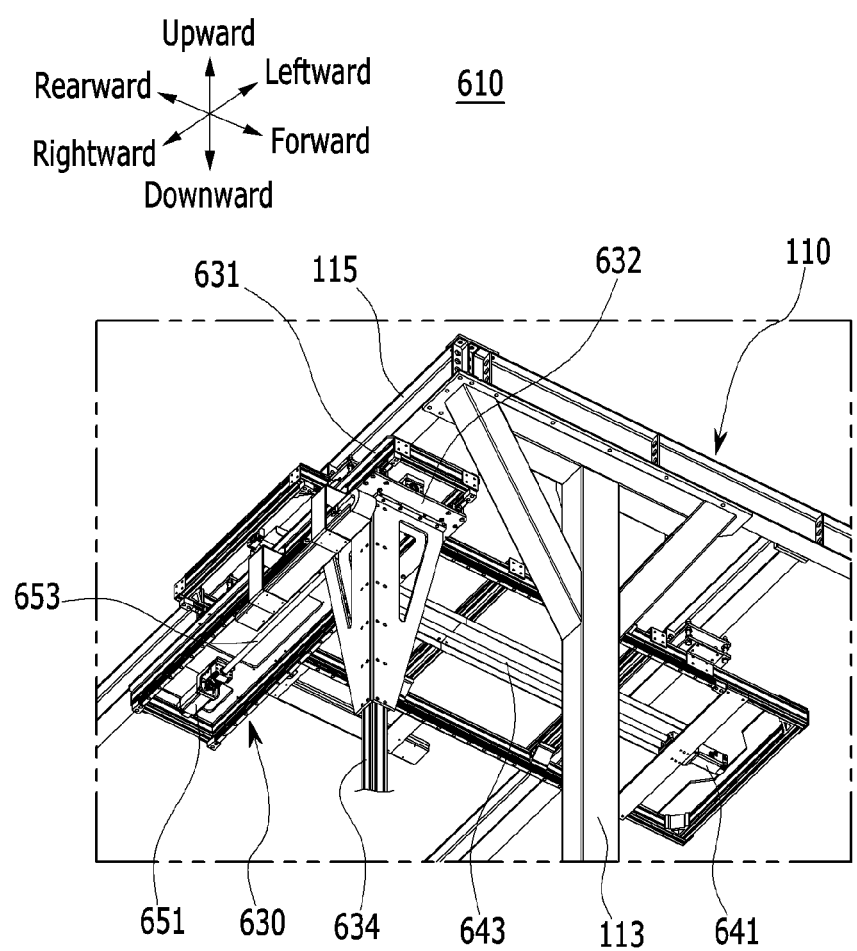
Figure 13:
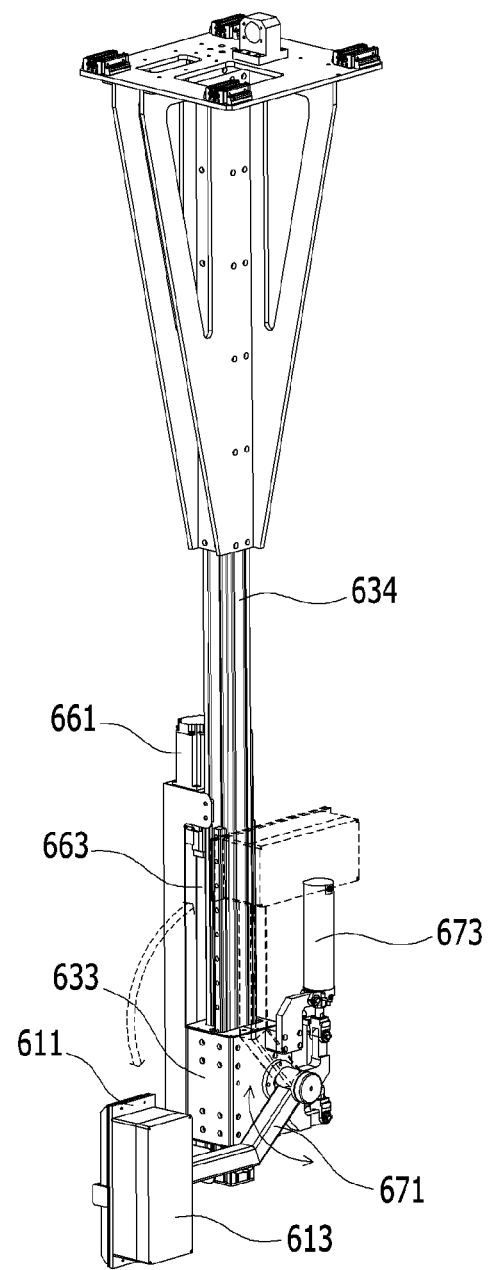

FIGS. 11 to 13 are drawings of a BSD inspection unit applicable to the inspection device of the DASs according to the exemplary embodiment of the present invention.

Referring to FIGS. 11 and 12, in the exemplary embodiment of the present invention, the BSD inspection unit 610 includes a second target member 611, which is installed to be movable in multi-axis directions with respect to the upper frame 115 of the frame unit 110 according to a predetermined position of the vehicle 1 in accordance with the BSDs 4 at the rear side of the vehicle 1.

The second target members 611 are installed to be movable in multi-axis directions as a pair, as shown in FIG. 2, at the upper frame 115 for connecting the pair of pillar frames 113 at a vehicle entry side.

For example, the second target member 611 is provided as a plate with a predetermined width and a predetermined length, and a second radar reflector 613 is provided at a rear side of the second target member 611 (a side corresponding to the rear side of the vehicle).

The second radar reflector 613 is typically referred to as a Doppler generator in the art, and serves to reflect radar signals outputted from the BSD 4 and the BSD 4 receives the reflected radar signals.

In particular, in the exemplary embodiment of the present invention, a difference between a transmitted value of the radar signal outputted from the BSD 4 and a received value of the radar signal reflected from the second radar reflector 613 to be received through the BSD 4 are calculated to correct the measurement point of the BSD 4 and to check the normal operation of the BSD 4.

Meanwhile, the second target members 611 may be respectively installed such that it is movable in the front/rear, the left/right, and the up/down directions with respect to the upper frame 115 by a fourth moving unit 630.

The fourth moving unit 630 includes a first moving member 631, a second moving member 632, a third moving member 633, and a post member 634.

The first moving member 631 has a frame shape and is installed through the guiding apparatus or sliding apparatus such that it is moveable in the front/rear directions with respect to the upper frame 115.

The second moving member 632 has a plate shape and is installed through the guiding apparatus or sliding apparatus such that it is moveable in the left/right directions with respect to the first moving member 631.

In this case, as described above, the post member 634 is extendedly installed at the second moving member 632 in the up/down directions.

The third moving member 633 has a block shape and is installed through the guiding apparatus or sliding apparatus such that it is moveable in the up/down directions with respect to the post member 634.

The second target member 611 including the aforementioned second radar reflector 613 is installed at the third moving member 633.

On the other hand, the first moving member 631 is reciprocally movable in the front/rear directions with respect to the upper frame 115 by a first servo motor 641 and a first lead screw 643.

The first servo motor 641 is fixedly installed at the upper frame 115.

The first lead screw 643 is disposed along the front/rear directions of the upper frame 115, coupled to a driving shaft of the first servo motor 641, and installed to be rotatable with respect to the upper frame 115.

In this case, the first lead screw 643 is screw-fixed to a separate block that is fixed to the first moving member 631.

The second moving member 632 may be movable in the left/right directions with respect to the first moving member 631 by a second servo motor 651 and a second lead screw 653.

The second servo motor 651 is fixedly installed at the first moving member 631.

The second lead screw 653 is disposed along the left/right directions of the first moving member 631, coupled to a driving shaft of the second servo motor 651, and installed to be rotatable with respect to the first moving member 631.

In this case, the second lead screw 653 is screw-fixed to a separate block that is fixed to the second moving member 632.

The third moving member 633 may be movable in the up/down directions with respect to the post member 634 of the second moving member 632 by a third servo motor 661 and a third lead screw 663.

The third servo motor 661 is fixedly installed at the post member 634.

The third lead screw 663 is disposed along the up/down directions of the post member 634, coupled to a driving shaft of the third servo motor 661, and installed to be rotatable with respect to the post member 634.

In this case, the third lead screw 663 is screw-fixed to a separate block that is fixed to the third moving member 633.

On the other hand, the second target member 611 according to the exemplary embodiment of the present invention may be installed to be swingable with respect to the third moving member 633, such that it does not interfere with the vehicle 1 when the vehicle is entered or exited.

For this purpose, because the second target member 611 is coupled to the third moving member 633 through an arm member 671 such that it is swingable with respect to the third moving member 633 in the up/down directions, the arm member 671 is installed at the third moving member 633 such that it is rotatable thereto, and the second target member 611 is installed at one end portion of the arm member 671.

In this case, the arm member 671 may be rotatable in the up/down directions by an actuating cylinder 673.

The actuating cylinder 673 is fixedly installed at the third moving member 633 in the up/down directions such that its operating rod is reciprocally movable in the up/down directions.

In this case, the operating rod of the actuating cylinder 673 is coupled to the other end portion of the arm member 671. And when the arm member 671 rotates by the operation of the actuating cylinder 673, and then the second target member 611 may rotate in order to avoid interruption enter and leave of a vehicle or the second target member 611 may be positioned for inspection of the BSD 4.

Referring to FIGS. 1 and 2, the AVM inspection unit 910 according to the exemplary embodiment of the present invention may be provided to correct measurement points of the AVMs 5 at the front/rear and both lateral sides of the vehicle 1 and to check the normal operations of the AVMs 5.

In particular, because the AVMs 5 are installed at the front/rear bumpers and the left/right side mirrors of the vehicle 1, the AVM inspection unit 910 is provided to correct the measurement points of the AVMs 5 for detecting images in all directions of 360 degrees around the vehicle 1 through the cameras and to check if the detected images are normally provided to the driver in accordance with accumulated tolerance due to respective assemblies of the front bumper, the rear bumper, and the left and right side mirrors with respect to the vehicle body and respective assemblies of the AVMs 5 with respect to the front bumper, the rear bumper, and the left and right side mirrors.

Figure 14:
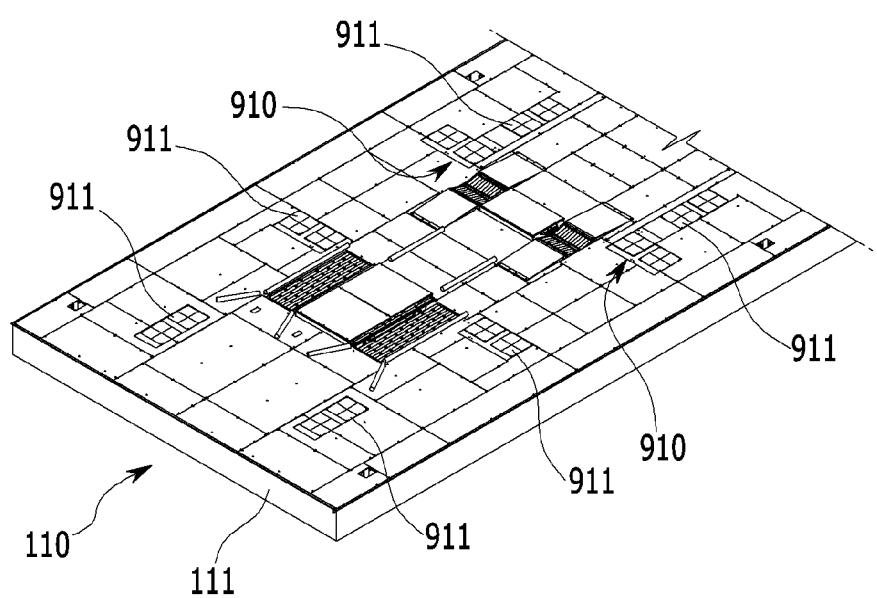
FIGS. 14 and 15 are drawings of an AVM inspection unit applicable to the inspection device of the DASs according to the exemplary embodiment of the present invention.
Figure 15:
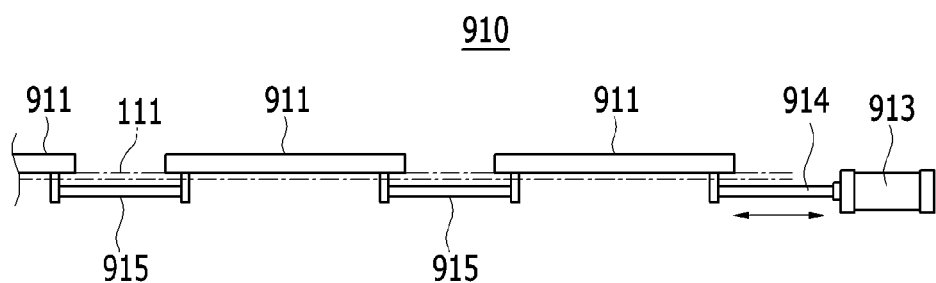

FIGS. 14 and 15 are drawings of an AVM inspection unit applicable to the inspection device of the DASs according to the exemplary embodiment of the present invention.

Referring to FIGS. 14 and 15, in the exemplary embodiment of the present invention, the AVM inspection unit 910 includes a third target member 911, which is installed to be movable in the front/rear directions with respect to the base frame 111 of the frame unit 110 according to the predetermined position of the vehicle 1 in accordance with the left and right sides of the vehicle 1.

The third target member 911 has a plate shape with a predetermined target shape and may be installed on the top surface of the base frame 111 through the guiding apparatus or sliding apparatus such that it is reciprocally moveable in the front/rear directions.

For example, a plurality of the third target members 911 may be provided on the top surface of the base frame 111 at the left and right sides of the vehicle 1 to be spaced apart from each other, such that they respectively correspond to front, center, and rear parts of the vehicle 1.

Meanwhile, the third target members 911 may be installed on the top surface of the base frame 111 such that they are reciprocally movable in the front/rear directions by an actuating cylinder 913 and link members 915.

The actuating cylinder 913 is fixedly installed at the front side of the base frame 111 such that its operating rod 914 is coupled to the third target member 911 that is provided at the front side of the base frame 111.

Further, the link members 915 respectively couple the third target members 911, which respectively correspond to the front, center, and rear parts of the vehicle 1, to each other in the front/rear directions at the left and right sides of the vehicle 1.

Because the aforementioned guiding apparatus or sliding apparatus is configured to slide the moving body into the fixed body using a linear method or an LM guiding apparatus of the disclosed technology with which the moving body can be guided to the fixed body, a detailed description thereof will be omitted in the present specification.

An operation of an inspection device 100 of a vehicle DAS according to the exemplary embodiment of the present invention, which is configured as describe above, will now be described in detail with reference to the previously disclosed drawings.

First, in the exemplary embodiment of the present invention, a completed vehicle 1 in which various kinds of parts are assembled in a vehicle assembly process is carried to the vehicle inspection line.

In the vehicle inspection line, operations of various kinds of DASs mounted on the completed vehicle 1 are corrected and the normal operations of the DASs are inspected.

Such correction/inspection processes for the various kinds of DASs will be described. First, in the exemplary embodiment of the present invention, each of different kinds of vehicles 1 is carried in on the top surface of the base frame 111.

In this case, the second target member 611 of the BSD inspection unit 610 is upwardly swung with respect to the third moving member 633 by the actuating cylinder 673, such that it does not interfere with the vehicle 1 when the vehicle 1 is carried in.

Further, in the exemplary embodiment of the present invention, the first free rollers 213 of the front wheel stopper 211 of the position aligning unit 210 and the second free rollers 233 of the rear wheel-supporting unit 231 may support the front and rear wheels of the vehicle 1 and determine the position of the vehicle 1 in the front/rear directions on the base frame 111.

In this case, the front wheel pusher 251 of the position aligning unit 210 moves forward in the left/right directions in accordance with the respective front wheels of the vehicle 1, locates the front wheels in the left/right directions through the first free rollers 213, and aligns the position of the front wheels of the vehicle 1 in the left/right directions.

The rear wheel pusher 271 of the position aligning unit 210 moves forward in the left/right directions in accordance with the respective rear wheels of the vehicle 1, locates the rear wheels through the second free rollers 233 in the left/right directions, and aligns the position of rear wheels of the vehicle 1 in the left/right directions.

As such, while each of the different kinds of vehicles 1 is being aligned at a predetermined position by the position aligning unit 210, in the exemplary embodiment of the present invention, as described above, the second target member 611 of the BSD inspection unit 610 is downwardly swung by the actuating cylinder 673 such that it is positioned at the rear side of the vehicle.

Then, in the exemplary embodiment of the present invention, the first LCD monitor 321 of the LDWS correction unit 310 is moved in the front/rear, the left/right, and the up/down directions according to the predetermined position of the vehicle 1 by the first moving unit 330 in accordance with an upper end of a head lamp aimer of the vehicle 1.

Further, in the exemplary embodiment of the present invention, a pair of first LCD monitors 321 may be manually moved in the left/right and the up/down directions by the minute adjustment unit 380 such that positions of the first LCD monitors 321 are minutely adjusted.

As such, while the pair of first LCD monitors 321 are automatically moved by the first moving unit 330 in the front/rear, the left/right, and the up/down directions and the positions of the first LCD monitor 321 are minutely adjusted by the minute adjustment unit 380 in accordance with the predetermined position of the vehicle 1, in the exemplary embodiment of the present invention, the respective first LCD monitors 321 display the virtual correction target 323 as images.

In particular, the respective first LCD monitors 321 respectively regenerate a single correction target 323 as the images, and adjust image positions and sizes of the correction targets 323 as two correction types through the image controller.

Thus, in the exemplary embodiment of the present invention, by using the virtual correction targets 323 that are displayed through the respective first LCD monitors 321, the camera measurement point of the LDWS 2 may be corrected in accordance with accumulated tolerance due to assembly of the windshield glass with respect to the vehicle body and assembly of the LDWS 2 with respect to the windshield glass.

Meanwhile, in the exemplary embodiment of the present invention, by using a pair of the first LCD monitors 321, as a single correction target type, the camera measurement point of the LDWS 2 may be corrected.

For this purpose, in the exemplary embodiment of the present invention, while the pair of first LCD monitors 321 are moved in the left or right direction by the first moving unit 330, the single correction target 323 with respect to the LDWS 2 may be displayed on any one of the first LCD monitors 321.

As such, in a state where the camera measurement point of the LDWS 2 is corrected by the first LCD monitor 321 of the LDWS correction unit 310, in the exemplary embodiment of the present invention, the first LCD monitor 321 of the LDWS correction unit 310 is restored to its original position.

Meanwhile, as described above, in a state where the camera measurement point of the LDWS 2 is corrected by the first LCD monitor 321 of the LDWS correction unit 310, in the exemplary embodiment of the present invention, the second LCD monitor 421 of the LDWS inspection unit 410 is moved in the front/rear and up/down directions by the second moving unit 430 according to the predetermined position of the vehicle 1 in accordance with the front side of the vehicle 1.

After the second LCD monitor 421 is automatically moved in the front/rear and the up/down directions in accordance with the predetermined position of the vehicle 1, in the exemplary embodiment of the present invention, the virtual driving lane 411 is visualized and displayed through the second LCD monitor 421.

In this case, the second LCD monitor 421 may reposition the image of the driving lane 411 in the left/right and the up/down directions and resize the image of the driving lane 411.

Thus, in the exemplary embodiment of the present invention, the images of the virtual driving lane 411 displayed through the second LCD monitor 421 are used to check through the camera of the LDWS 2 if the driving lane is normally recognized and to adequately provide an alarm sound or display to the driver while lane departure of the vehicle 1 is normally detected.

As described above, in checking the normal operation of the LDWS 2 through the second LCD monitor 421 of the LDWS inspection unit 410, in the exemplary embodiment of the present invention, the first target member 511 of the SCC inspection unit 510 is automatically movable in accordance with the front side of the vehicle in the front/rear, the left/right, and the up/down directions according to the predetermined position of the vehicle 1 by the third moving unit 530.

In this case, in the exemplary embodiment of the present invention, the blocking member 570 of the SCC inspection unit 510 is moved in the left/right directions by the actuating cylinder 571 such that one first radar reflector 513 is blocked and two first radar reflectors 513 are exposed with respect to the first target member 511.

Alternatively, in the exemplary embodiment of the present invention, the blocking member 570 may be moved in the left/right directions by the actuating cylinder 571 such that two first radar reflectors 513 are blocked and one first radar reflector 513 is exposed with respect to the first target member 511.

Thus, in the exemplary embodiment of the present invention, a difference between a transmitted value of the radar signal outputted from the SCC 3 and a received value of the radar signal reflected from the first radar reflector 513 to be received through the SCC 3 are calculated to correct the measurement point of the SCC 3 and to check the normal operation of the SCC 3.

In particular, in the exemplary embodiment of the present invention, the first target member 511 of the SCC inspection unit 510 is provided to correct the measurement point of the SCC 3 and to check the normal operation of the SCC 3 in accordance with accumulated tolerance due to assembly of the FEM module with respect to the vehicle body and assembly of the SCC 3 with respect to the FEM module.

Meanwhile, in the exemplary embodiment of the present invention, the second target member 611 of the BSD inspection unit 610 is automatically moved in the front/rear, the left/right, and the up/down directions according to the predetermined position of the vehicle by the fourth moving unit 630 in accordance with the rear side of the vehicle 1.

In this case, while being downwardly swung by the actuating cylinder 673, the second target member 611 including the second radar reflector 613 may be moved in the front/rear, the left/right, and the up/down directions by the fourth moving unit 630.

Thus, in the exemplary embodiment of the present invention, a difference between a transmitted value of the radar signal outputted from the BSD 4 and a received value of the radar signal reflected from the second radar reflector 613 to be received through BSD 4 are calculated to correct the measurement point of the BSD 4 and to check the normal operation of the BSD 4.

In particular, in the exemplary embodiment of the present invention, the second target member 611 of the BSD inspection unit 610 may be provided to correct the measurement point of the BSD 4 and to check the normal operation of the BSD 4 in accordance with accumulated tolerance due to assembly of the rear bumper with respect to the vehicle body and assembly of the BSD 4 with respect to the rear bumper.

On the other hand, in the exemplary embodiment of the present invention, the third target member 911 of the AVM inspection unit 910 is automatically moved at left/right sides of the vehicle 1 in the front/rear directions thereof in accordance with the predetermined position of the vehicle 1.

Thus, the exemplary embodiment of the present invention may be provided to correct the measurement point of the AVMs 5 for detecting images in all directions of 360 degrees around the vehicle 1 through the cameras and to check if the detected images are normally provided to the driver in accordance with accumulated tolerance due to respective assemblies of the front bumper, the rear bumper, and the left and right side mirrors with respect to the vehicle body and respective assemblies of the AVMs 5 with respect to the front bumper, the rear bumper, and the left and right side minors.

In particular, in the exemplary embodiment of the present invention, the third target member 911 of the AVM inspection unit 910 is provided to correct the measurement point of the AVMs 5 and to check the normal operation of the AVMs 5 in accordance with accumulated tolerance due to respective assemblies of the front bumper, the rear bumper, and the left and right side mirrors with respect to the vehicle body and respective assemblies of the AVMs 5 with respect to the front bumper, the rear bumper, and the left and right side mirrors.

As described above, in the exemplary embodiment of the present invention, the LDWS 2, the SCC 3, the BSD 4, and the AVM 5 are respectively corrected/inspected in sequence by the LDWS correction unit 310, the LDWS inspection unit 410, the SCC inspection unit 510, the BSD inspection unit 610, and the AVM inspection unit 910, but the correction/inspection sequences are not limited thereto and may be varied depending on a logic of the controller for controlling the overall system.

As described above, the inspection device 100 of the vehicle DAS may integrate the separated correction/inspection processes of the various kinds of DASs into the single process, such that the correction/inspection processes for various kinds of DASs applied to different kinds of vehicles may be commonly used.

Accordingly, in the exemplary embodiment of the present invention, an inspection cycle time may be reduced to save inspection manpower and to efficiently perform quality management, such that flexible production for various types of vehicles is possible in addition to saving additional manpower and investment cost due to modification and/or new construction of the inspection facility when a new kind of vehicle is applied.

While this invention has been described in connection with what is presently considered to be practical exemplary embodiments, it is to be understood that technical aspects of the present invention are not limited to the exemplary embodiments suggested in the specification, but, although a person of ordinary skill in this field of art who understands the technical aspects of the present invention can suggest another exemplary embodiment by modifications, changes, removal, and addition of constituent elements within a range of technical aspects that are the same as in the present invention, it will also be within a range of right of the present invention.

What is claimed is:

1. An inspection device of vehicle driver assistance systems (DASs) mounted on a vehicle, comprising:
a frame unit including pillar frames, where vehicles forwardly enter and backwardly exit, at respective corners of a base frame, wherein an upper frame is coupled to upper end portions of the pillar frames;
a lane departure warning system (LDWS) correction unit installed at the upper frame such that it is movable in multi-axis directions so as to correct a camera measurement point of a lane departure warning system (LDWS) at a front side of the vehicle and configured to display a correction target with respect to the camera as an image;
a lane departure warning system (LDWS) inspection unit installed at the upper frame such that it is movable in multi-axis directions so as to check a normal operation of the LDWS and configured to display a driving lane as an image; and
an SCC inspection unit configured to check a normal operation of a smart cruise control (SCC) system at the front side of the vehicle,
wherein the SCC inspection unit is installed at the base frame such that it is movable in multi-axis directions, and includes a first target member including at least one first radar reflector with respect to the SCC,
wherein the first radar reflectors are provided in plural at the first target member, and
wherein the SCC inspection unit further includes a blocking member that is configured to unblock any one of the first radar reflectors and block the remaining ones or to block any one of the first radar reflectors.

2. The device of claim 1, further comprising
a position aligning unit installed at the base frame and configured to align different kinds of vehicles at a predetermined position.

3. The device of claim 1, further comprising
inspection units respectively installed at the frame unit and configured to check normal operations of DASs including a smart cruise control (SCC) system, blind spot detection (BSD) system, and around view monitoring (AVM) system.

4. The device of claim 1, further comprising
a BSD inspection unit installed at the upper frame at a vehicle entry side so as to check a normal operation of a blind spot detection (BSD) system at rear sides of the vehicle.

5. The device of claim 4, wherein
the BSD inspection units are installed as a pair at the upper frame, such that they are movable in multi-axis directions and respectively include a second target member including a second radar reflector with respect to the BSD.

6. The device of claim 5, wherein
the second target member is installed at the upper frame such that it is movable in forward, backward, width, and length directions of the vehicle by a fourth moving unit.

7. The device of claim 6, wherein
the second target member is provided such that it is upwardly and downwardly swingable by the actuating cylinder when vehicles enter or exit.

8. The device of claim 4, further comprising
an around view monitoring (AVM) inspection unit installed at a top surface of the base frame so as to check normal operations of respective AVMs at front and rear sides of the vehicle and both lateral sides of the vehicle.

9. The device of claim 8, wherein
the AVM inspection unit includes a plurality of third target members, which are installed on a top surface of the base frame such that they are movable in the forward and backward directions.

10. The device of claim 9, wherein
the third target members are installed at the base frame such that they are movable in forward and backward directions by an actuating cylinder and a link member.

11. The device of claim 1, wherein
the LDWS correction unit includes at least one first LCD monitor that displays a correction target and is configured to adjust an image position and an image size of the correction target.

12. The device of claim 11, wherein
the first LCD monitor is installed such that it is movable in forward, backward, width, and length directions of the vehicle by a first moving unit including a servo motor and an actuating cylinder.

13. The device of claim 1, wherein
the LDWS inspection unit includes a second LCD monitor that displays a driving lane and is configured to adjust an image position and an image size of the driving lane.

14. The device of claim 13, wherein
the second LCD monitor is installed at the upper frame such that it is movable in forward, backward, width, and length directions of the vehicle by a second moving unit including a servo motor and an actuating cylinder.

15. The device of claim 1, wherein
the first target member is installed at the base frame such that it is movable in forward, backward, width, and length directions of the vehicle by a third moving unit including a servo motor.

16. The device of claim 1, wherein
the blocking member is installed at the first target member such that it is reciprocally movable in width directions of the vehicle by an actuating cylinder.

17. An inspection device for inspecting various kinds of vehicle driver assistance systems (DASs) mounted on a vehicle, comprising:
a frame unit including pillar frames, where the vehicle is moved forward to enter and is moved backward to exit, at respective corners of a base frame, wherein an upper frame is coupled to upper end portions of the pillar frames;
a position aligning unit installed at the base frame and configured to align different kinds of vehicles at a predetermined position;
a lane departure warning system (LDWS) correction unit installed at the upper frame such that it is movable in accordance with a front side of a vehicle in forward, backward, width, and length directions of the vehicle so as to correct a camera measurement point of an LDWS at the front side of the vehicle and configured to display a correction target with respect to the camera as an image;

an LDWS inspection unit installed at the upper frame such that it is movable in accordance with the front side of the vehicle in the forward, backward and length directions and configured to display a driving lane as an image so as to check a normal operation of the LDWS;

a smart cruise control (SCC) inspection unit installed at the base frame such that it is movable in accordance with the front side of the vehicle in forward, backward, width, and length directions of the vehicle so as to check a normal operation of an SCC at the front side of the vehicle;

a blind spot detection (BSD) inspection unit at the upper frame, which connects a pair of pillar frames at a vehicle entry side, such that it is movable in the forward, backward, the width, and the length directions of the vehicle so as to check normal operations of BSDs at the rear side of the vehicle; and an around view monitoring (AVM) inspection unit installed at a top surface of the base frame such that it is movable in the forward and backward directions so as to check normal operations of AVMs at the front and rear sides of the vehicle and both lateral sides of the vehicle wherein the SCC inspection unit includes a first target member including at least one first radar reflector with respect to the SCC, wherein the first radar reflectors are provided in plural at the first target member, and wherein the SCC inspection unit further includes a blocking member that is configured to unblock any one of the first radar reflectors and block the remaining ones or to block the any one of the first radar reflectors.

* * * * *